US009620936B2

(12) United States Patent
Katano

(10) Patent No.: US 9,620,936 B2
(45) Date of Patent: Apr. 11, 2017

(54) ION/OZONE WIND GENERATION DEVICE AND METHOD

(71) Applicant: Katano Kogyo Co., Ltd., Yokohama-shi, Kanagawa (JP)

(72) Inventor: Akio Katano, Yokohama (JP)

(73) Assignee: KATANO KOGYO CO., LTD., Kanagawa (JP)

( * ) Notice: Subject to any disclaimer, the term of this patent is extended or adjusted under 35 U.S.C. 154(b) by 0 days.

(21) Appl. No.: 14/890,676

(22) PCT Filed: Dec. 20, 2013

(86) PCT No.: PCT/JP2013/084370
§ 371 (c)(1),
(2) Date: Nov. 12, 2015

(87) PCT Pub. No.: WO2014/184984
PCT Pub. Date: Nov. 20, 2014

(65) Prior Publication Data
US 2016/0111859 A1    Apr. 21, 2016

(30) Foreign Application Priority Data

May 13, 2013   (JP) ................................. 2013-100920
Aug. 23, 2013  (JP) ................................. 2013-173299

(51) Int. Cl.
*H01T 19/04*   (2006.01)
*H01T 23/00*   (2006.01)
(Continued)

(52) U.S. Cl.
CPC .......... *H01T 19/04* (2013.01); *B60H 3/0078* (2013.01); *F24F 3/166* (2013.01); *H01T 19/02* (2013.01);
(Continued)

(58) Field of Classification Search
CPC .......... H01T 9/04; H60H 3/0078; F24F 3/166
(Continued)

(56) References Cited

U.S. PATENT DOCUMENTS 5,474,600 A    12/1995  Volodina et al.
5,733,512 A *   3/1998  Tsai ........................ C01B 13/11
                                                    422/186.15
(Continued)

FOREIGN PATENT DOCUMENTS

JP        11-12239      8/1936
JP        59-193158    11/1984
(Continued)

*Primary Examiner* — Scott Bauer
(74) *Attorney, Agent, or Firm* — Norris McLaughlin & Marcus, P.A.

(57) ABSTRACT

An ion/ozone wind generation device includes a plurality of electrode pairs having a needle-shaped electrode and an opposite electrode, ions, ozone, and ion wind being generated using corona discharge by generating a potential difference between the respective electrode pairs. In this device, the opposite electrode in each of the electrode pairs is formed into a planar and annular or spiral shape, a main electrode pair as a pair of electrodes and a plurality of sub-electrode pairs as electrode pairs in which the opposite electrodes are regularly located adjacent or proximate to each other so as to surround the opposite electrode in the main electrode pair along an outer circumference of the opposite electrode in the main electrode pair are provided, and planar normal vectors in all the opposite electrodes are directed in substantially the same directions.

9 Claims, 17 Drawing Sheets

(51) Int. Cl.
*F24F 3/16* (2006.01)
*H01T 19/02* (2006.01)
*B60H 3/00* (2006.01)

(52) U.S. Cl.
CPC ...... *H01T 23/00* (2013.01); *F24F 2003/1685* (2013.01); *F24F 2221/28* (2013.01); *Y02P 20/133* (2015.11)

(58) Field of Classification Search
USPC .................................................. 361/230, 231
See application file for complete search history.

(56) References Cited

U.S. PATENT DOCUMENTS

| | | | | |
|---|---|---|---|---|
| 7,771,672 | B2* | 8/2010 | Bergeron | A61L 9/015 |
| | | | | 422/121 |
| 8,355,238 | B2* | 1/2013 | Lee | H01T 23/00 |
| | | | | 361/230 |
| 8,576,535 | B2* | 11/2013 | Sekoguchi | A61L 9/22 |
| | | | | 250/423 F |
| 2004/0170542 | A1* | 9/2004 | Taylor | A61L 9/015 |
| | | | | 422/186.04 |
| 2012/0300356 | A1 | 11/2012 | Katano | |

FOREIGN PATENT DOCUMENTS

| | | |
|---|---|---|
| JP | 7-501013 | 2/1995 |
| JP | 7-250786 | 10/1995 |
| JP | 9-38524 | 2/1997 |
| JP | 10-025103 | 1/1998 |
| JP | 10-199653 | 7/1998 |
| JP | 10-286303 | 10/1998 |
| JP | 2002-136893 | 5/2002 |
| JP | 2003-342005 | 12/2003 |
| JP | 2004-18348 | 1/2004 |
| JP | 3100754 | 5/2004 |
| JP | 2005-13831 | 1/2005 |
| JP | 2005-149901 | 6/2005 |
| JP | 3155540 | 11/2009 |
| JP | 2011-175949 | 9/2011 |

* cited by examiner

FIG.7
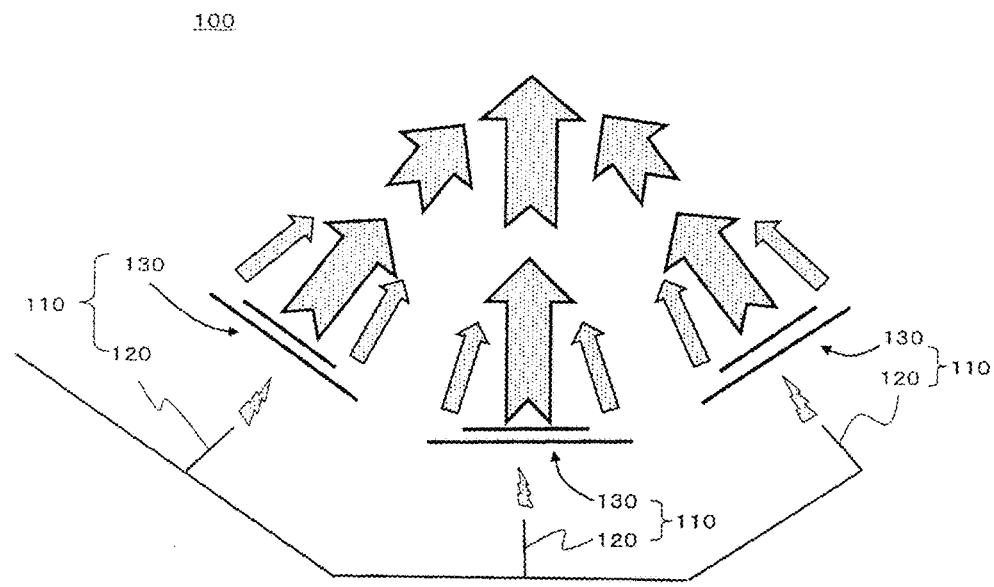
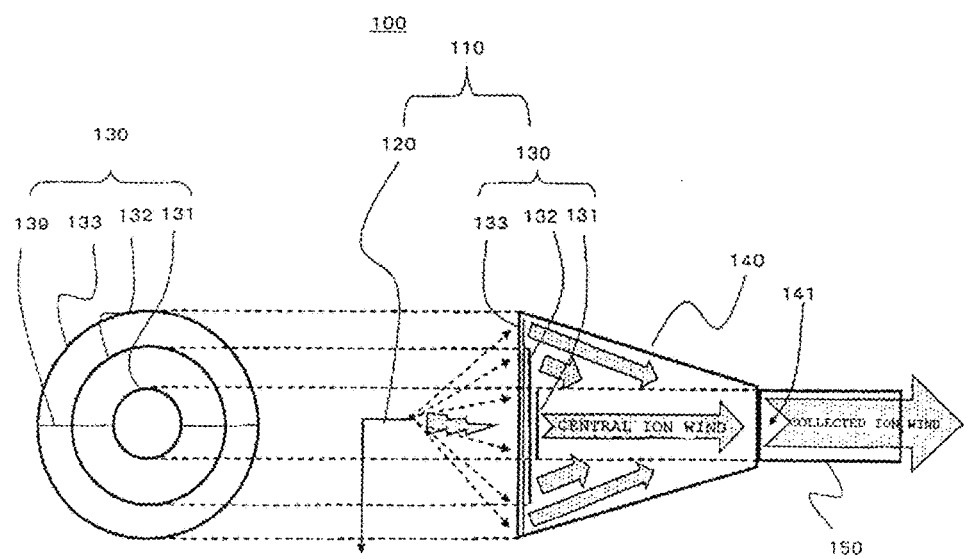
Fig. 8(a)   Fig. 8(b)

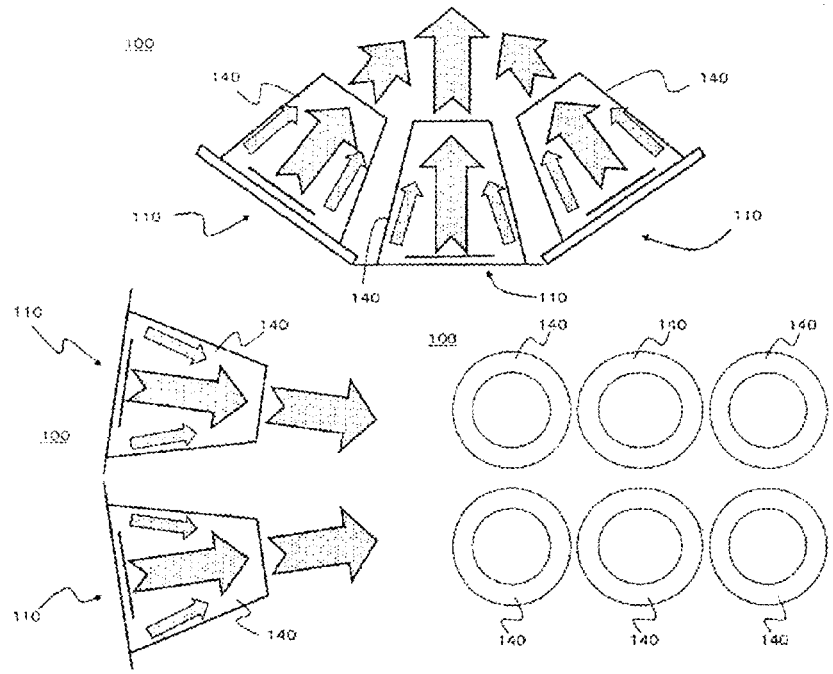
Fig. 10(a)
Fig. 10(b)　　　Fig. 10(c)
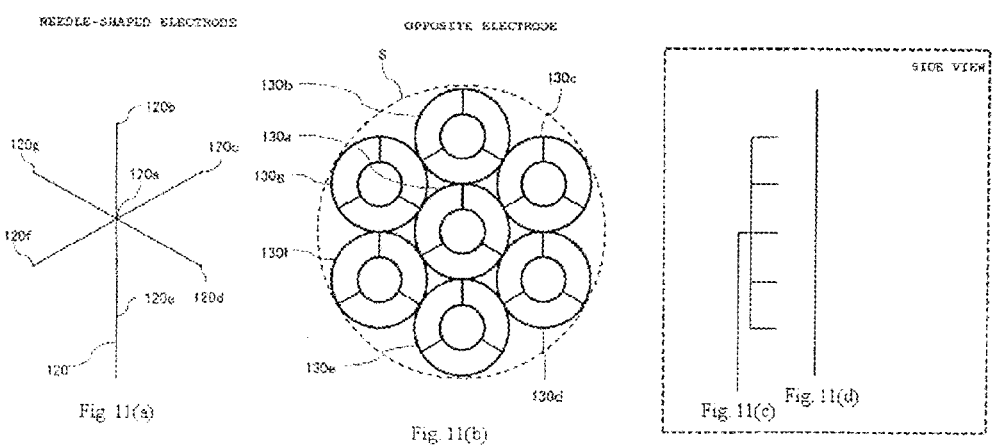
Fig. 11(a)　　Fig. 11(b)　　Fig. 11(c)　Fig. 11(d)

FIG.12
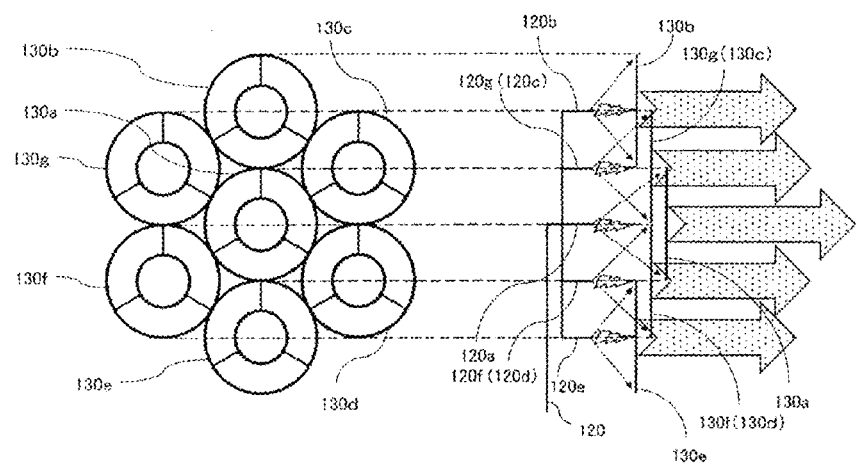
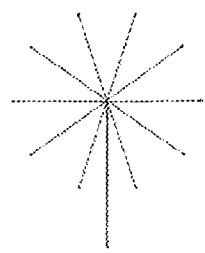
Fig. 13(a)
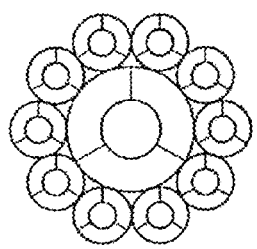
Fig. 13(b)
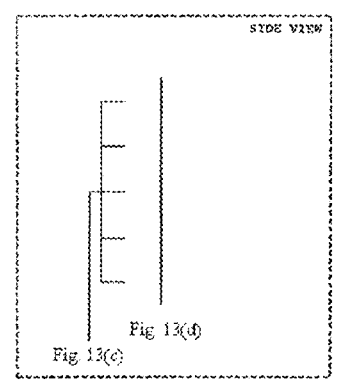
Fig. 13(c)  Fig. 13(d)

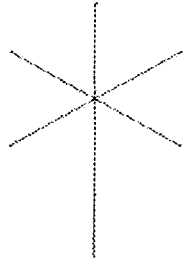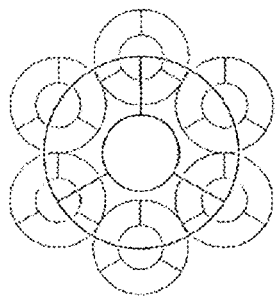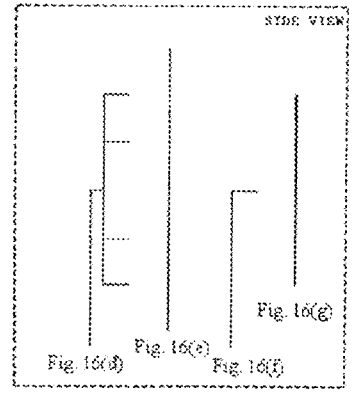
Fig. 16(a)  Fig. 16(b)  Fig. 16(c)  Fig. 16(d)  Fig. 16(e)  Fig. 16(f)
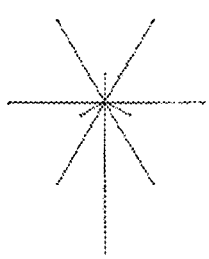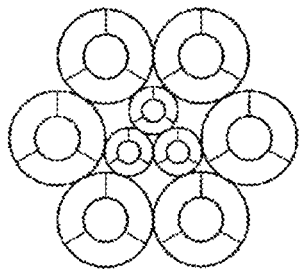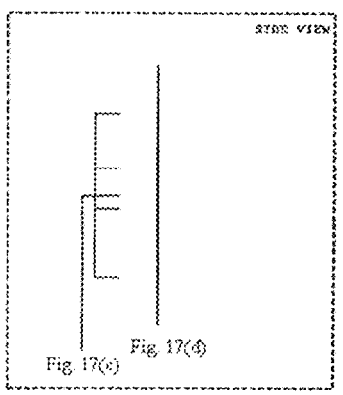
Fig. 17(a)  Fig. 17(b)  Fig. 17(c)  Fig. 17(d)

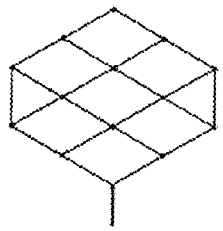
Fig. 27(a)
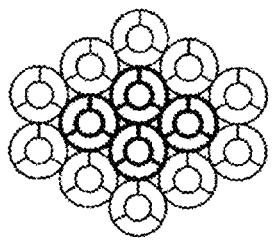
Fig. 27(b)
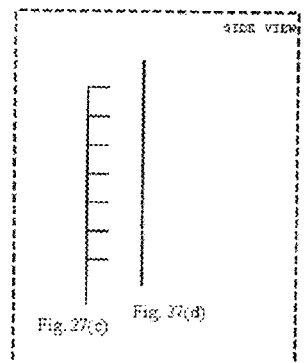
Fig. 27(c)  Fig. 27(d)
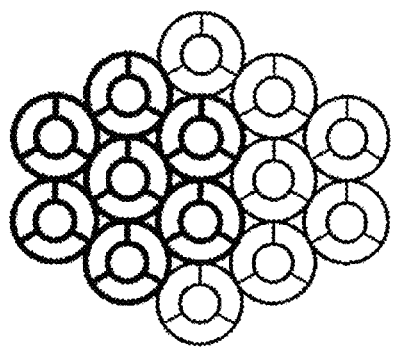
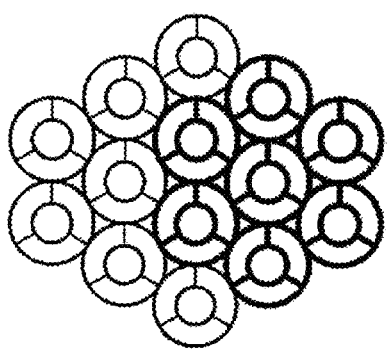
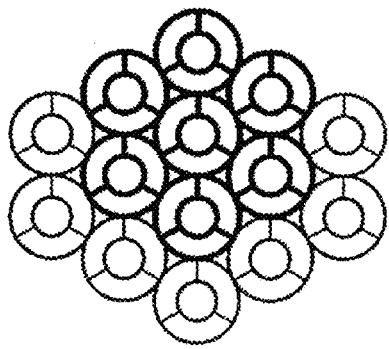
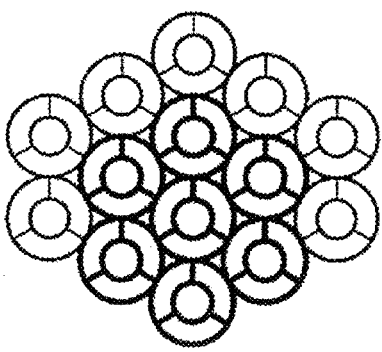
Fig. 28

ION/OZONE WIND GENERATION DEVICE AND METHOD

TECHNICAL FIELD

The present invention relates to a device for generating ion wind using corona discharge and, more particularly to an ion wind generation device for generating a larger volume of ion wind. In a certain aspect, the present invention relates to a device and method for sterilizing/deodorizing a target object such as waste, and in particular, to a device and method for performing corona discharge in a space that is separate from a space in which a target object is placed, generating ions and ozone, supplying ion/ozone wind to the space in which the target object is placed, and sterilizing/deodorizing the target object. More specifically, the present invention relates to an environmental device for sterilizing/deodorizing a target object by being equipped at a high airtight box, for example, a disposal box for garbage, diaper or the like, a box for receiving shoes, boots or a disposed odor of a garbage disposer, a toilet and a toilet tank, a high airtight container equipped with a refrigerating device and a vehicle equipped with a refrigerating device, a refrigerator, an indoor/in-vehicle air conditioner, or the like.

BACKGROUND ART

Due to aging of the society, there has been a high demand for a disposal box for diapers and the like in proportion with the population who need nursing care. However, the offensive odor that is released every time the box is opened gives discomfort or a burden to a caregiver and the ambient, and also it is unsanitary. Further, although garbage storage boxes are present in homes and restaurants, since offensive odor caused by growth of bacteria is released every time the boxes are opened, a burden on relevant workers such as housewives is large. As the use of garbage disposer increases due to the development of biotechnology, offensive odor released around the garbage disposer during operation has become a very serious problem. In addition, transportation by transport containers, trucks, and the like are mainly used for foreign/domestic distribution of refrigerated/normal-temperature products, and the like, and there are a number of marine containers/on-land containers/container-type trucks and the like equipped with air conditioners. However, residual odor of loaded products and musty odor in air conditioners have become problematic. Further, air conditioners for storehouses, refrigerators, or indoor/in-vehicle spaces have the problem of offensive odor depending on the usage conditions including stored materials.

As a solution to the above problem, a simplified sterilizer/deodorizer, such as a spray type, has been proposed in the past. However, when such a simplified sterilizer/deodorizer is used in a waste box or a garbage storage box, offensive odor is released when the box is opened. Further, when it is used in an air conditioner (as, for example, dispersive or cyclic sterilization system), the problem is that there is a region, in an air conditioner, incapable of being cleaned; or abnormal odor and musty odor left after cleaning migrate to subsequently loaded products. In addition, as another solution technique, a method of suctioning air from a sterilizing/deodorizing target space and adsorbing or removing contaminated materials by a filter, or an expensive catalyst that removes offensive odor has been proposed. However, maintenance such as replacement of a filter is necessary for long-term use. In addition, in many cases, satisfactory performance may not be obtained because the performance of a filter is insufficient. Even when the filter performance is good, a large and expensive catalyst body and a high maintenance cost are required in many cases.

However, recently, air cleaners and air conditioners for generating negative ions or ozone for cleaning and refreshing indoor air have been introduced. There have been proposed a plurality of technologies for deodorizing a target space by using a negative ion/ozone generation device that simultaneously generates negative ions and ozone that have a deodorizing effect.

First, a negative ion/ozone generation device according to Patent Literature 1 is designed to be installed on a ceiling of a room and is configured such that a positive electrode is located beneath a negative electrode. According to this configuration, a downstream airflow containing negative ions and ozone can be generated even without using a fan or a motor.

Next, a negative ion/ozone generation device according to Patent Literature 2 includes a cathode electrode having a needle-shaped tip and a cylindrical ground electrode that is concentrically installed in parallel to the cathode electrode, in which the cathode electrode and the ground electrode are relatively movable. A high voltage is applied to the cathode electrode to adjust the distance between the tip portion of the cathode electrode and the end of the ground electrode, thereby generating negative ions or ozone.

Next, a negative ion/ozone generation device according to Patent Literature 3 applies a high direct voltage between a needle-shaped electrode and an earth electrode to generate corona discharge at the apical portion of the needle-shaped electrode, thereby generating ozone or negative ions.

Next, a negative ion/ozone generation device according to Patent Literature 4 includes a positive electrode consisting of a metal plate having one or more holes with an erected portion therearound, and a negative electrode having a tip located adjacent to the holes of the positive electrode. With this configuration, since a sufficient airflow is generated by discharge, an air stream capable of diffusing generated negative ions or ozone in a space can be generated even without using a separate blower device such as a fan or a pump.

The inventions according to the Patent Literatures 1 to 4 describe generating ions and ozone and applying the same to a target object. However, these technologies, for example, assume that the device is placed in a sterilizing/deodorizing target space, such as inside of a trashcan, and performs discharge. For example, if in a trash can, an organic matter releasing offensive odor may be resolved by microorganisms to generate flammable gas such as methane gas. When discharge is performed in this state, fire or explosion may occur due to the generation of spark.

Thus, in order to remove such a danger, research is being conducted to develop an external sterilizing/deodorizing device that performs discharge outside a space of a target object, generates ions and ozone, and introduces the generated materials into the space in which the target object is placed (Patent Literature 5).

Further, in an air cleaner according to Patent Literature 6, a plurality of needle-shaped electrodes and planar collector electrodes are arranged. However, since this technique intends to generate ions, if ion "wind" is generated, the force of the ion wind is not considered. Accordingly, as described in the Patent Literature 6 (in particular, FIGS. 1 and 2), if the electrodes are significantly separated from each other, when the ion wind is generated, the wind force is significantly reduced, so that there is a problem that the ion wind is less likely to reach a target object.

Further, Patent Literatures 7 to 9 each describe a device for generating ion wind using a needle-shaped electrode and a planar opposite electrode. However, in those techniques, there is a problem that the force of the generated ion wind is insufficient from a practical viewpoint.

Further, Patent Literatures 10 and 11 describe an ion wind generation device in which arranged needle-shaped electrodes and cylindrical opposite electrodes are arranged. However, if the opposite electrode has a cylindrical shape as with those techniques, there is a problem that the force of the generated ion wind is insufficient from a practical viewpoint even if a plurality of electrodes are combined.

Furthermore, Patent Literature 12 discloses the technique of forming an opposite electrode into not a cylindrical shape but a plate shape for ease of cleaning. However, the technique disclosed in the Patent Literature 12 has a problem that the force of generated ion wind is insufficient from a practical viewpoint as with the Patent Literatures 7 to 9.

CITATION LIST

Patent Literature

Patent Literature 1: Japanese Utility Model Registration No. 3100754
Patent Literature 2: JP 2003-342005 A
Patent Literature 3: JP 2004-18348 A
Patent Literature 4: JP 2005-13831 A
Patent Literature 5: Japanese Utility Model Registration No. 3155540
Patent Literature 6: JP 2002-136893 A
Patent Literature 7: JP H7-250786 A
Patent Literature 8: JP H9-038524 A
Patent Literature 9: JP S59-193158 A
Patent Literature 10: JP H10-286303 A
Patent Literature 11: JP 2005-149901 A
Patent Literature 12: JP H10-025103 A

SUMMARY OF INVENTION

Technical Problem

If the negative ion/ozone generation devices shown in those Patent Literatures can be miniaturized to be easily carried by a user, the usable width thereof is abruptly expanded. However, when the negative ion/ozone generation device is miniaturized to be easily carried by a user, an electrode configuration inevitable for generation of corona discharge has strict limitations on space, so that a discharge amount in the corona discharge and the force of ion wind generated by the corona discharge are inevitably reduced by miniaturization of the electrode configuration. Although it is preferable to drive the device with a battery (for example, a lithium ion battery), like a cellular phone, due to the fact that it is difficult to obtain high voltage from the battery, there is a problem that the discharge amount in the corona discharge and the force of ion wind generated by the corona discharge are reduced. Namely, in the negative ion/ozone generation device, since it is inevitable that miniaturization (achievement of portability) is equal to reduction in ion wind, some ingenuity for transmitting ion wind, generated by corona discharge, to a target object without reducing the force of the ion wind as much as possible are required for commercialization. However, as long as the miniaturization (achievement of portability) is closely aimed, it is preferable to exercise ingenuity in the electrode configuration as an inevitable configuration of a negative ion/ozone generation device without providing additional devices such as a blower device and a booster converter. The present invention has been made in this context and provides means for generating ion wind well regardless of the miniaturization (achievement of portability) of a negative ion/ozone generation device.

Solution to Problem

According to the present invention (1), there is provided an ion/ozone wind generation device including a plurality of electrode pairs having a needle-shaped electrode and an opposite electrode, ions, ozone, and ion wind being generated using corona discharge by generating a potential difference between the respective electrode pairs, in which the opposite electrode in each of the electrode pairs is formed into a planar and annular or spiral shape, a main electrode pair as a pair of electrodes and a plurality of sub-electrode pairs as electrode pairs in which the opposite electrodes are regularly located adjacent or proximate to each other so as to surround the opposite electrode in the main electrode pair along an outer circumference of the opposite electrode in the main electrode pair are provided, the shortest distance between the outer circumferences of the adjacent opposite electrodes at least in the sub-electrode pairs is not more than a diameter of the opposite electrodes thereof, planar normal vectors in all the opposite electrodes are directed in substantially the same directions, the opposite electrode in the main electrode pair and the opposite electrodes in the sub-electrode pairs are formed by through holes in a planar electroconductive member, and the planar electroconductive member has a through hole formed along the outer circumference of the opposite electrodes in the sub-electrode pairs.

According to the present invention (2), there is provided the ion/ozone wind generation device recited in the present invention (1), in which the opposite electrode has a planar main annular opposite electrode and planar sub annular opposite electrodes surrounding the main annular opposite electrode, the longest distance between a tip of a needle-shaped electrode in a certain electrode pair and the main annular opposite electrode in the certain electrode pair is smaller than the shortest distance between the tip of the needle-shaped electrode in the certain electrode pair and the sub annular opposite electrodes in the certain electrode pair.

According to the present invention (3), there is provided the ion/ozone wind generation device recited in the present invention (1) or (2), in which the opposite electrodes in all the electrode pairs have substantially the same shape.

According to the present invention (4), there is provided an ion/ozone wind generation device including a plurality of electrode pairs having a needle-shaped electrode and an opposite electrode, ions, ozone, and ion wind being generated using corona discharge by generating a potential difference between the respective electrode pairs, in which the opposite electrode in each of the electrode pairs is formed into a planar and annular or spiral shape, a main electrode pair as a pair of electrodes and a plurality of sub-electrode pairs as electrode pairs in which the opposite electrodes are regularly located adjacent or proximate to each other so as to surround the opposite electrode in the main electrode pair along an outer circumference of the opposite electrode in the main electrode pair are provided, the shortest distance between the outer circumferences of the adjacent opposite electrodes at least in the sub-electrode pairs is not more than a diameter of the opposite electrodes thereof, planar normal vectors in all the opposite electrodes are directed in substantially the same directions, the opposite electrode has a planar main annular opposite electrode and planar sub annular opposite electrodes surrounding the main annular opposite electrode, the longest distance between a tip of a needle-shaped electrode in a certain electrode pair and the main annular opposite electrode in the certain electrode pair is smaller than the shortest distance between the tip of the needle-shaped electrode in the certain electrode pair and the sub annular opposite electrodes in the certain electrode pair.

According to the present invention (5), there is provided the ion/ozone wind generation device recited in the present invention (4), in which the opposite electrode in the main electrode pair and the opposite electrodes in the sub-electrode pairs are formed by through holes in a planar electroconductive member, and the planar electroconductive member has a through hole formed along the outer circumference of the opposite electrodes in the sub-electrode pairs.

According to the present invention (6), there is provided the ion/ozone wind generation device recited in the present invention (4) or (5), in which the opposite electrodes in all the electrode pairs have substantially the same shape.

<Additional Statement>

Although matters related to the above described matters related to the present invention are described below, the present invention can be implemented without being limited thereto.

According to the present invention (1), there is provided an ion/ozone wind generation device (for example, embodiments shown in FIGS. 11 and 13 to 16) including a plurality of electrode pairs having a needle-shaped electrode and an opposite electrode, ions, ozone, and ion wind being generated using corona discharge by generating a potential difference between the respective electrode pairs, in which the opposite electrode in each of the electrode pairs is formed into a planar and annular or spiral shape, a main electrode pair as a pair of electrodes and a plurality of sub-electrode pairs as electrode pairs in which the opposite electrodes are regularly located adjacent or proximate to each other so as to surround the opposite electrode in the main electrode pair along an outer circumference of the opposite electrode in the main electrode pair are provided, the shortest distance between the outer circumferences of the adjacent opposite electrodes at least in the sub-electrode pairs is not more than a diameter of the opposite electrodes thereof, and planar normal vectors in all the opposite electrodes are directed in substantially the same directions.

According to the present invention (2), there is provided the ion/ozone wind generation device recited in the present invention (1) (for example, an embodiment shown in the right drawing of FIG. 26), in which the opposite electrode in the main electrode pair and the opposite electrodes in the sub-electrode pairs are formed by through holes in a planar electroconductive member, and the planar electroconductive member has a through hole formed along the outer circumference of the opposite electrodes in the sub-electrode pairs.

According to the present invention (3), there is provided the ion/ozone wind generation device recited in the present invention (1) or (2) (for example, embodiments shown in FIGS. 11 and 13 to 16 or an embodiment shown in FIG. 11), in which the opposite electrode has a planar main annular opposite electrode and planar sub annular opposite electrodes surrounding the main annular opposite electrode, the longest distance between a tip of a needle-shaped electrode in a certain electrode pair and the main annular opposite electrode in the certain electrode pair is smaller than the shortest distance between the tip of the needle-shaped electrode in the certain electrode pair and the sub annular opposite electrodes in the certain electrode pair.

According to the present invention (4), there is provided the ion/ozone wind generation device recited in any one of the present inventions (1) to (3) (for example, an embodiment shown in FIG. 11), in which the opposite electrodes in all the electrode pairs have substantially the same shape.

The respective terms used herein will now be described. A "sterilizing/deodorizing target object" is not particularly limited as long as it breeds bacteria or releases offensive odor. Specific examples of the sterilizing/deodorizing target object include raw garbage such as fresh food, manures, waste materials such as diapers, and water in a reservoir. A "space in which a sterilizing/deodorizing target object is placed" is not particularly limited as long as the space includes a sterilizing/deodorizing target object. Examples of the space of a sterilizing/deodorizing target object include a high-airtight box, more particularly, a disposal box for raw garbage or diaper, a high-airtight container equipped with a refrigerating device, and a vehicle equipped with a refrigerating device. "Annular" refers to, for example, a polygonal shape having three or more vertices (preferably, six or more), a circular shape, or a substantially circular shape, and refers to a shape with a center opening. "Spiral" refers to, for example, a polygonal shape having three or more vertices (preferably, six or more), a circular shape, or a substantially circular shape, and refers to a shape swirling toward the center, and an aspect of a spiral (for example, the number of turns, the turning width, or the presence or absence of the end point) is not particularly limited. "Planar" refers to a shape of an annular electrode that can be generally regarded as a plane because the thickness is relatively smaller with respect to the total area in a ring of the annular electrode. More specifically, without limitation, [Thickness (mm)]/[Total area in a ring (cm$^2$)] is preferably not more than 1.5, preferably not more than 1, and more preferably not more than 0.8. Without limitation, the lower limit value is, for example, 0.0001. Further, a distortion (distortion on a plane) up to a degree of a thickness may be allowed. More specifically, it is more preferable that the total area of a main annular opposite electrode is 7 cm$^2$, the thickness is not more than 7 mm, and the distortion is not more than 7 mm. The "longest distance between a tip of the needle-shaped electrode and the main annular opposite electrode" refers to the longest distance between the tip of the needle-shaped electrode and the portion of the main annular opposite electrode that is an inner side end of the ring and is nearest in the thickness direction. The "shortest distance between a tip of the needle-shaped electrode and the sub annular opposite electrode" refers to the shortest distance between the tip of the needle-shaped electrode and the portion of the sub annular opposite electrode that is an inner side end of the ring and is nearest in the thickness direction. "Main ion wind" refers to ion wind generated from an opening portion at the center of the main annular opposite electrode. "Sub ion wind" refers to ion wind generated from the sub annular opposite electrode. In "generation of a potential difference between electrode pairs", examples of the potential difference includes a potential difference generated when an opposite electrode is grounded while a voltage is applied to a needle-shaped electrode, and in this case, the polarity (anode/cathode) of the needle-shaped electrode is not particularly limited.

Advantageous Effects of Invention

According to an ion/ozone wind generation device of the present invention, since ion wind generated by a main electrode pair is pushed to the front side while being pushed from behind by tailwind of ion wind generated by a sub-electrode pair, even if the respective electrode pairs are miniaturized, the effect of transmitting the ion wind, generated by corona discharge, to a target object without reducing the force of the ion wind as much as possible is provided. In addition, it is possible to configure such that the rate at which the ion wind generated by the respective electrode pairs is in contact with the adjacent (proximate) ion wind (that is, the rate at which opposite electrodes are adjacent (proximate) to each other) increases larger than the rate at which the ion wind is in contact with static ambient air (that is, the rate at which the opposite electrodes are not adjacent (proximate) to each other). This configuration can further enhance the same effect.

According to the present invention, ion wind of a relatively high wind pressure is generated from a main annular opposite electrode, and ion wind of a relatively low wind pressure is generated from a sub annular opposite electrode surrounding the main annular opposite electrode, whereby without detaining the generated ion wind, the ion wind generated from the inside can circumvolute the ion wind generated from the outside to be pushed to the front side, so that a large volume of ion wind of a high wind pressure can be obtained.

With respect to the ion wind of a relatively high wind pressure generated from the main annular opposite electrode, the ion wind of a relatively low wind pressure is generated from the sub annular opposite electrode, whereby the ion wind generated from the sub annular electrode supports the ion wind generated from the main annular opposite electrode. Namely, since the ion wind generated from the main annular opposite electrode is ion wind generated in tailwind, a large volume of strong wind can be obtained.

Further, since an ion wind generation device according to the present invention can generate ions and ozone having a sterilizing/deodorizing function by corona discharge, it is preferable that the ion wind generation device is used as a sterilizing/deodorizing device. According to the present device, a large volume of ion wind can be generated, and even in the case of an external sterilizing/deodorizing device, ions and ozone can be introduced into a target space without using a mechanism such as an air pump. Namely, since a pump or a fan need not be used, a low-noise sterilizing/deodorizing device can be provided. In addition, since the ion wind generated from the sub annular opposite electrode can be circumvoluted, ions and ozone generated from these electrodes can be circumvoluted. Therefore, since ion wind containing high-concentration ions and ozone can be sent out, higher-efficiency deodorization can be achieved.

BRIEF DESCRIPTION OF DRAWINGS

FIG. 7 is a conceptual plan view of an ion/ozone wind generation device 100.

FIG. 8(a) is a conceptual front view of an opposite electrode 130 of a relevant device, and FIG. 8(b) is a conceptual side view of the ion/ozone wind generation device 100.

FIG. 10(a) is a conceptual plan view of an ion/ozone wind generation device, FIG. 10(b) is a conceptual side view of the ion/ozone wind generation device, and FIG. 10(c) is a conceptual front view of the ion/ozone wind generation device viewed from an exhaust nozzle.

FIGS. 11(a), 11(b), 11(c), 11(d) are conceptual views of a needle-shaped electrode and an opposite electrode in another embodiment.

FIG. 12 is a conceptual operational view of an ion/ozone wind generation device in another embodiment.

FIGS. 13(a), 13(b), 13(c), 13(d) are conceptual views of a needle-shaped electrode and an opposite electrode in another embodiment.

FIGS. 16(a), 16(b), 16(c), 16(d), 16(e), 16(f) are conceptual views of a needle-shaped electrode and an opposite electrode in another embodiment.

FIGS. 17(a), 17(b), 17(c), 17(d) are conceptual views of a needle-shaped electrode and an opposite electrode in another embodiment.

FIG. 27 is a conceptual view of a needle-shaped electrode and an opposite electrode in another embodiment.

FIG. 28 is an image drawing of annular opposite electrodes in a main electrode pair.

DESCRIPTION OF EMBODIMENTS

An ion/ozone wind generation device according to the present invention includes an electrode pair including a needle-shaped electrode and an opposite electrode, and ions and ion/ozone wind are generated using corona discharge by generating a potential difference between the needle-shaped electrode and the opposite electrode. Further, in the ion/ozone wind generation device according to the present invention, the opposite electrode includes a planar main annular opposite electrode and a planar sub annular opposite electrode surrounding the planar main annular opposite electrode, wherein the longest distance between a tip of the needle-shaped electrode and the main annular opposite electrode is smaller than the shortest distance between the tip of the needle-shaped electrode and the sub annular opposite electrode.

A large volume of ion wind can be obtained by such a configuration. In the case of a simple cylindrical or plane circular opposite electrode, since a donut-shaped ion wind is generated by generating discharge in the shape of a donut along the inside of a plane circular electrode or the inside of a cylindrical electrode that are opposite and are located at the minimum distance, a center portion of the donut of an ion wind center is in a windless state. Accordingly, the ion wind is weakened as a result of the existence of a loss using energy by which the generated ion wind guides wind to a windless center portion. As with the present invention, a relevant problem can be solved by proving a main annular opposite electrode and a sub annular opposite electrode.

An ion/ozone wind generation device according to the present invention includes an electrode pair including a needle-shaped electrode and an opposite electrode, and ions/ozone and ion wind are generated using corona discharge by generating a potential difference between the needle-shaped electrode and the opposite electrode. Further, the ion wind is generally considered as an airflow that is generated from the needle-shaped electrode to the opposite electrode when ions emitted from the needle-shaped electrode during the corona discharge repeat a collision with air molecules while migrating to the opposite electrode. Namely, the ion wind is an airflow that is generated along the flow direction of ions generated during the discharge. A detailed structure of an ion/ozone wind generation device according to the present invention will be described below.

Figures 1A, 1B:
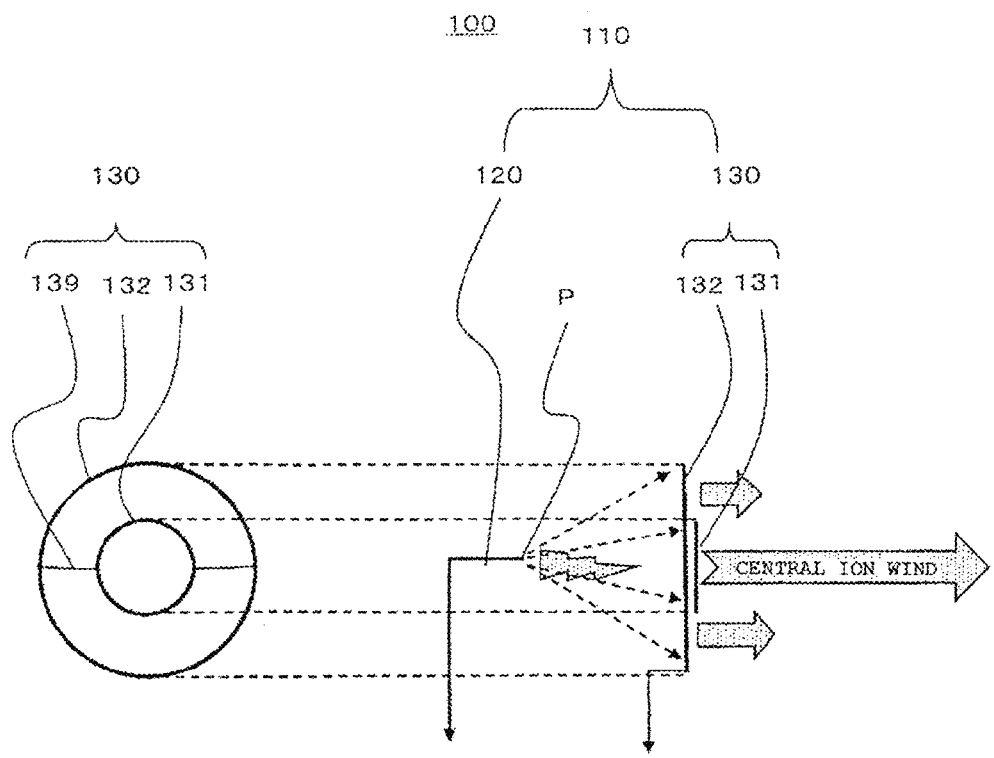
FIG. 1(a) is a conceptual front view of an opposite electrode of a relevant device.
FIG. 1(b) is a conceptual side view of an ion/ozone wind generation device 100.

A schematic configuration of an ion/ozone wind generation device according to the present invention is shown in FIGS. 1(a), 1(b). Here, FIG. 1(a) is a conceptual front view of an opposite electrode of a relevant device, and FIG. 1(b) is a conceptual side view of an ion/ozone wind generation device 100. The ion/ozone wind generation device 100 according to the present embodiment includes an electrode pair 110 including a needle-shaped electrode 120 and an opposite electrode 130. Here, the opposite electrode 130 includes a circular annular electrode 131 that is located at the innermost position placed on an extended line axis of the needle-shaped electrode 120, and an outer circular annular electrode 132 that is placed on the same axis as the relevant electrode and has a different radius therefrom. Namely, these circular annular electrodes are perpendicular to an annular plane, and also are placed on an axis passing through a center of the relevant ring (a circle center). By virtue of the use of such a circular annular opposite electrode among the annular opposite electrodes, discharge unevenness is reduced since distances from a tip of the needle-shaped opposite electrode to each position of the opposite electrode are approximately equal. Further, since the needle-shaped electrode is placed on an axis of the ring, ion wind generated from the main annular opposite electrode is particularly strengthened.

These annular electrodes 131 and 132 are preferably bridged by a connection member, such as a bridge 139, so that a current can flow therebetween. According to this constitution, the respective annular electrodes can be equipotential, and also a positional relation between these electrodes can be easily adjusted. For example, when connected by a wave-shaped member, a substantially triangular shape is formed between the main annular opposite electrode and the sub annular opposite electrode. Accordingly, unevenness is generated in corona discharge and a large volume of ion wind is not pushed forward. Therefore, in order not to obstruct the generation of ion wind, it is preferable that the connection member is placed such that a conceptual straight line connecting a junction between the connection member and the sub annular opposite electrode and a junction between the connection member and the main annular opposite electrode passes through the center of the main annular opposite electrode. With such a connection, uneven generation of the ion wind caused by discharge unevenness is hardly generated.

The main annular opposite electrode and the sub annular opposite electrode constituting the opposite electrode may preferably be placed on the same plane. Since the distance gradually weakens discharge efficiency of the sub annular opposite electrode rather than the main annular opposite electrode, the relevant distance may be easily changed by placing them on the same plane, which is preferable. Further, in a three-dimensional respect, even if a distance ratio is correct, for example, in the case of a dome shape and the like, the efficiency of ion wind is degraded since the generation direction of the ion wind is not parallel to straight wind generated by the main ion wind.

Further, the needle-shaped electrode 120 and the opposite electrode 130 are respectively connected to a voltage applying unit or a ground, discharge is generated by generating a potential difference between the relevant electrodes in use. Here, it is preferable that a positional relation between a tip portion P of the needle-shaped electrode 120 and the innermost main annular opposite electrode 131 is most suitable for generating ion wind. By placing them at such a distance, since it becomes a small-radius annular opposite electrode located more central than the opposite electrode, relatively strong ion wind is generated and thus a large volume of ion wind can be obtained. In the event of such a positional relation, the annular opposite electrodes may be placed on the same plane, and may be placed on separate planes. Further, dashed arrows shown from the tip portion P to the annular opposite electrode in the drawings represent the migration direction of ions caused by corona discharge.

Figures 2A, 2B:
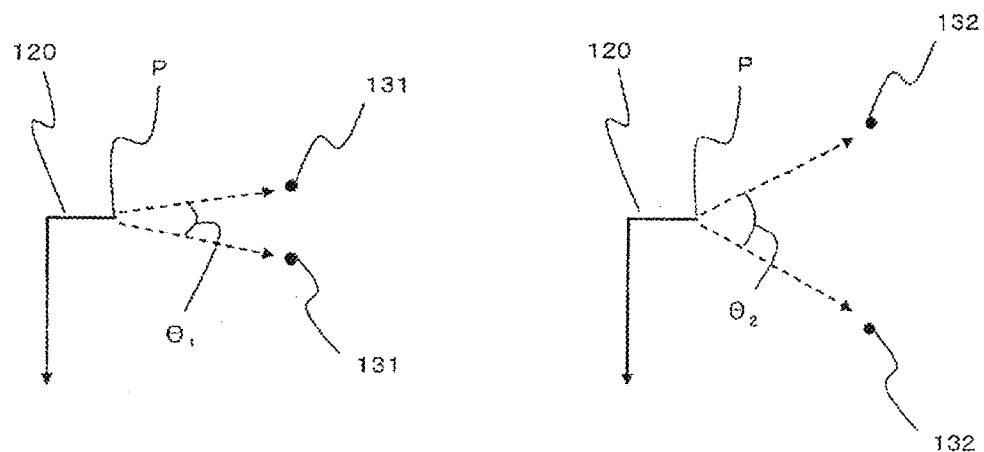
FIG. 2(a) is a diagram illustrating a positional relation between a ring-shaped electrode 131 and a tip portion P of a needle-shaped electrode 120 by using a cross section of the ring-shaped electrode 131 located at the innermost.
FIG. 2(b) is a diagram illustrating a positional relation between a ring-shaped electrode 132 and the tip P.

A positional relation suitable for generating ion wind will be described by using pattern diagrams of FIGS. 2(a), 2(b). FIG. 2(a) shows a positional relation between the annular opposite electrode 131 and a tip portion P of the needle-shaped electrode 120 by using a cross section of the annular opposite electrode 131 located at the innermost, and FIG. 2(b) shows a positional relation between an annular opposite electrode 132 and the tip portion P.

First, if it is in a positional relation between the tip portion P and the annular opposite electrode 131, ions migrate toward the electrode along the directions of arrows. That is, theoretically, ion wind is generated at an angle of $\theta_1$ from the tip portion P. Accordingly, in general, ion wind is generated in the direction of a bus line connecting an apex of a cone being an apex of the tip portion P and a bottom end. Namely, ion wind is also generated toward the outside direction of the annular opposite electrode, but in general, the ion wind is pushed out mainly toward the front direction from the center of the annular opposite electrode. On the other hand, in the case of a ring-shaped electrode having a relatively large radius like the annular opposite electrode 132 shown in FIG. 2(b), theoretically, ion wind is generated at an angle of $\theta_2$ from the tip portion P. Namely, since the relevant angle is increased, a large volume of ion wind derived from this electrode is pushed toward the outside direction of the annular opposite electrode, and a small amount of the ion wind is pushed out toward the front direction.

Further, corona discharge is apt to be generated with respect to the opposite electrode located near the needle-shaped electrode. As the annular opposite electrode is located closer to the center, the distance from the tip portion P of the needle-shaped electrode is smaller. That is, since the probability of corona discharge generation is higher in the annular opposite electrode located at the center, the absolute wind pressure of ion wind generated is higher in the annular opposite electrode located at the center.

As described above, the innermost annular opposite electrode 131 is advantageous in terms of the direction of ion wind generation, and in addition, the absolute wind pressure of ion wind is also high. Accordingly, the opposite electrode as shown in FIGS. 1(a), 1(b) is in a state of being placed such that ion wind generated from the annular opposite electrode is strengthened as the radius of the annular electrode is reduced. With such a placement, it is not detained by the ion wind generated from an external electrode, and it is circumvoluted by the ion wind generated from the center. Therefore, the volume of ion wind increases, and also ions and ozone generated by discharge can be pushed to the front side by the ion wind. Accordingly, the sterilizing/deodorizing effect is also increased. Further, it is more preferable that the distance between the innermost annular opposite electrode 131 and the tip portion P is maintained at a distance at which corona discharge is apt to be best generated. However, when the diameter of an annular portion of the opposite electrode is increased, a discharge reaction is generated greatly but is generated in the shape of a donut. Therefore, when an opposite electrode portion is not provided at an annular center of the opposite electrode, a windless center portion is also increased and thus discharge unevenness occurs to generate donut-shaped ion wind. Accordingly, since the outer circumference and the center of the generated ion wind become a windless state and thus the donut-shaped ion wind guides wind to a windless region, strong wind is not generated. When the diameter of the annular portion is small, ion wind having a high wind pressure is generated but a generated amount thereof is small. Therefore, the sub annular opposite electrode being the secondary electrode is placed at the outer circumference of the main annular opposite electrode, so that mainstream wind having a small diameter and a high wind pressure is generated at the center while substream wind having a large diameter, a low wind pressure, and a large volume is generated at the outer circumference. Namely, the opposite electrode according to the present invention has a shape satisfying both of the high wind pressure and the large volume of ion wind generated at the same potential, which solves the existing problem that a wind pressure is low and a wind volume is large when a diameter is large, and a wind pressure is high and a wind volume is small when a diameter is small.

When the opposite electrode is formed to have a planar shape, the ion wind generated from the opposite electrode is not decelerated by the reaction between the ion wind and an obstacle such as a wall surface, and main ion wind generated from the main annular opposite electrode and sub ion wind generated from the sub annular opposite electrode are combined immediately. Therefore, since the main ion wind can rapidly obtain a synergy effect caused by tailwind by the surrounding sub ion wind immediately after the generation, a larger volume of ion wind can be obtained. Meanwhile, when the opposite electrode is formed to have a cylindrical shape, for example, a wall surface exists in the opposite electrode, and therefore, the ion wind generated from the opposite electrode is decelerated by the reaction between the walls surface and the ion wind. Thus, when the opposite electrode is formed to have a planar shape, a large volume of ion wind can be obtained unlike the case where the opposite electrode is formed to have a cylindrical shape or the like. In addition, when the opposite electrode is formed into not a cylindrical shape or the like but a planar shape, device miniaturization can be achieved, and even if the device miniaturization has been achieved, the volume of ion wind cannot be reduced unlike the prior art. Further, when the opposite electrode is formed into a planar shape, the opposite electrode can be easily cleaned. For example, when a metal mesh-like opposite electrode as in the Patent Literature 9 is used, each opposite electrode is not annular, and, in addition, a planar normal vector in each opposite electrode does not point in substantially the same direction. Therefore, discharge unevenness is apt to occur in each opposite electrode, and, in addition, the force of ion wind generated from the opposite electrode is not uniformized, so that due to such an influence, the ion wind generated from the opposite electrode is decelerated (the ion winds generated by the respective opposite electrodes are not synthesized optimally), and therefore, it is not preferable.

In the ion/ozone wind generation device according to the present invention, the longest distance between the tip of the needle-shaped electrode and the main annular opposite electrode is smaller than the shortest distance between the tip of the needle-shaped electrode and the sub annular opposite electrode. When the needle-shaped electrode and the opposite electrode are placed in such a distance relation, ion wind having the highest wind pressure is generated from an opening portion formed at the center of the main annular opposite electrode and ion wind having a low wind pressure is generated from the surrounding sub annular opposite electrode, so that a large volume of ion wind can be obtained. When deviating from the positional relation between the needle-shaped electrode and the annular electrode, ion wind is generated mainly from the space between the main annular opposite electrode and the sub annular opposite electrode. Accordingly, the ion wind becomes even wind, and therefore, ion wind emitted to the air is weakened. In addition, a reaction is also generated when a guide member is provided.

Figures 3A, 3B:
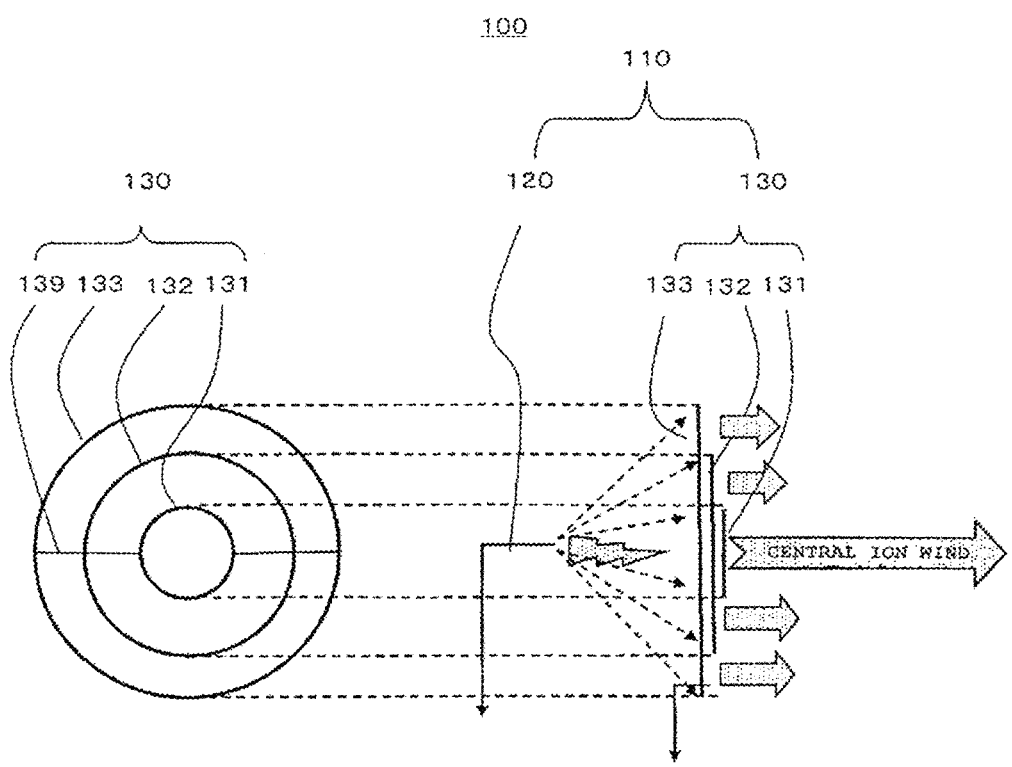
FIG. 3(a) is a conceptual front view of an opposite electrode 130 of a relevant device.
FIG. 3(b) is a conceptual side view of the ion/ozone wind generation device 100.

The number of annular opposite electrodes constituting the opposite electrode 130 is not limited to two as shown in FIGS. 1(a), 1(b), and many annular opposite electrodes, for example, annular opposite electrodes 131 to 133 as shown in FIGS. 3(a), 3(b), may be provided. Further, FIG. 3(a) is a conceptual front view of an opposite electrode 130 of a relevant device, and FIG. 3(b) is a conceptual side view of an ion/ozone wind generation device 100. Herein, although the case of using three annular opposite electrodes has been described, any number of annular opposite electrodes constituting the opposite electrode may be provided as long as they satisfies the distance relation with the needle-shaped electrode. By virtue of the provision of many electrodes as described above, even when one of the electrodes is contaminated and unable to generate discharge, the discharge can be generated by another electrode, thus improving the operational stability of the device.

Figures 5A, 5B:
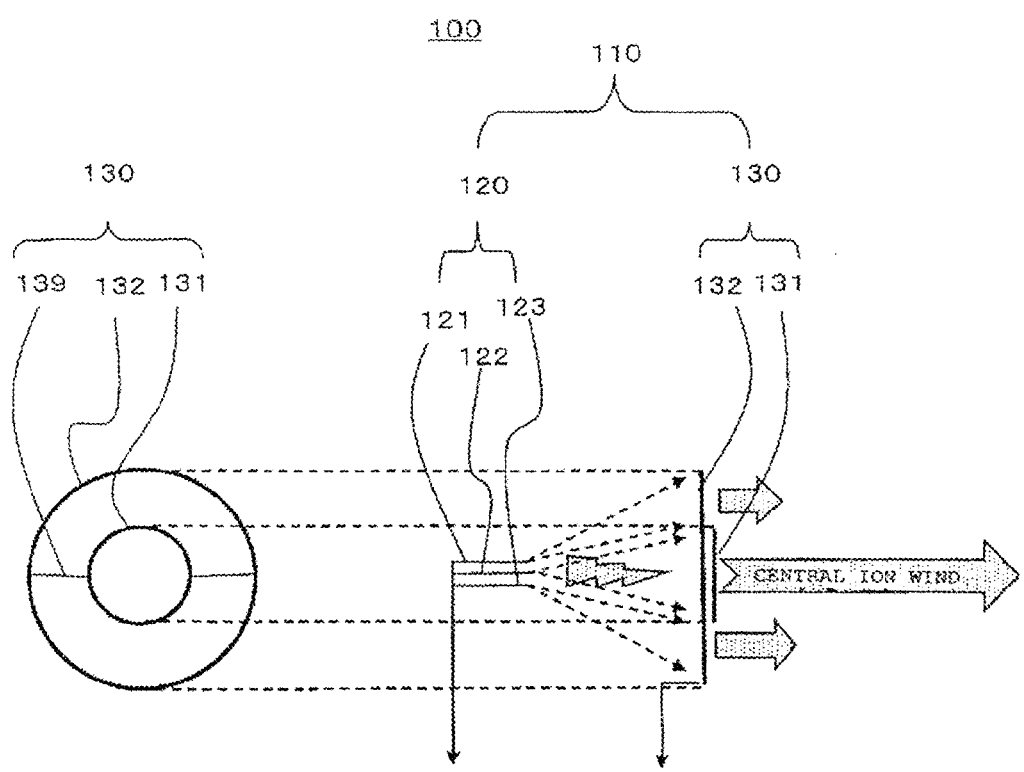
FIG. 5(a) is a conceptual front view of an opposite electrode of a relevant device.
FIG. 5(b) is a conceptual side view of the ion/ozone wind generation device 100.

As shown in FIGS. 5(a), 5(b), a plurality of needle-shaped electrodes, for example, needle-shaped electrodes 121 to 123 may be provided. In this case, all of the needle-shaped electrodes and the opposite electrodes are placed such that the longest distance between the tip of the needle-shaped electrode and the main annular opposite electrode is smaller than the shortest distance between the tip of the needle-shaped electrode and the sub annular opposite electrode. Further, FIG. 5(a) is a conceptual front view of an opposite electrode of a relevant device, and FIG. 5(b) is a conceptual side view of an ion/ozone wind generation device 100. By virtue of the provision of a plurality of needle-shaped electrodes as described above, the pushing capability is increased due to the high possibility of a molecule collision caused by the frequent occurrence of a dielectric breakdown. Accordingly, a larger amount of ozone can be generated as compared to the case of a single polarity.

Figures 4A, 4B:
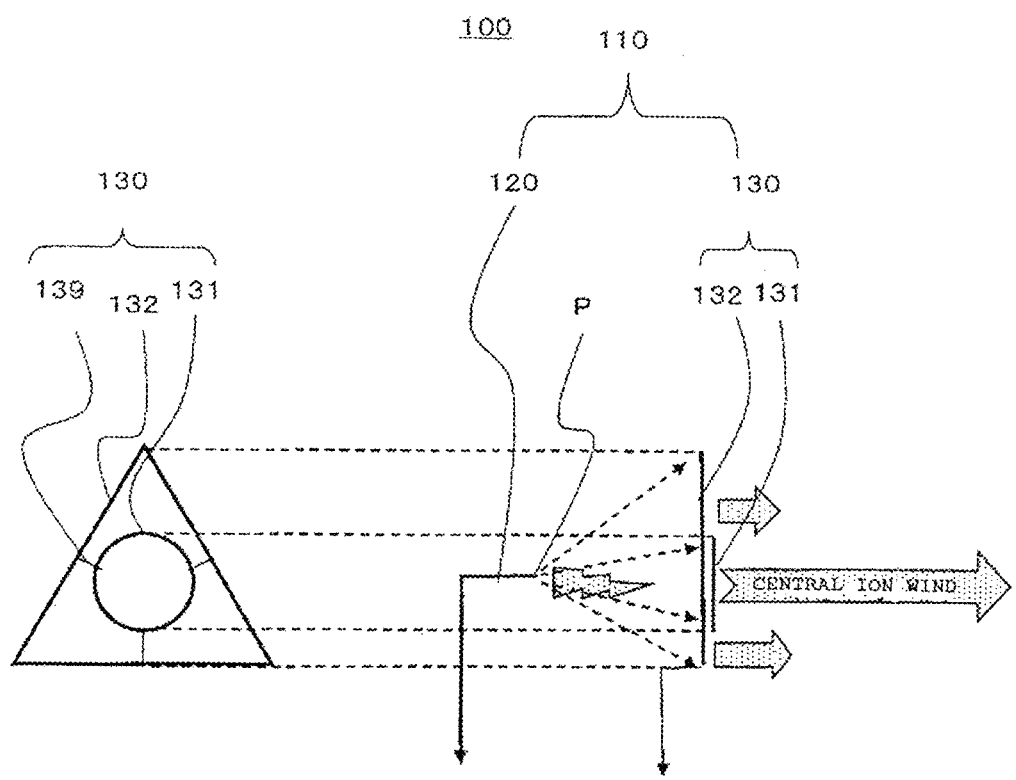
FIG. 4(a) is a conceptual front view of an opposite electrode of a relevant device.
FIG. 4(b) is a conceptual side view of the ion/ozone wind generation device 100.

As shown in FIGS. 4(a), 4(b), the opposite electrode according to the present invention may be polygonal. Further, in this case, each of the needle-shaped electrodes and the opposite electrodes are placed such that the longest distance between the tip of the needle-shaped electrode and the main annular opposite electrode is smaller than the shortest distance between the tip of the needle-shaped electrode and the sub annular opposite electrode. Further, FIG. 4(a) is a conceptual front view of an opposite electrode of a relevant device, and FIG. 4(b) is a conceptual side view of an ion/ozone wind generation device 100. Even when the opposite electrode is triangular, a large volume of ion wind can be obtained since the volume of ion wind generated from the main annular opposite electrode is smaller than the volume of ion wind generated from the sub annular opposite electrode. Further, although the main annular opposite electrode is illustrated as being circular herein, it may be a polygonal shape having three or more vertices. Further, when the annular opposite electrode is polygonal, it has an advantage that discharge unevenness hardly occurs because the number of points having the shortest distance from the needle-shaped electrode increases as the number of sides increases.

Figures 6A, 6B, 6C, 6D:
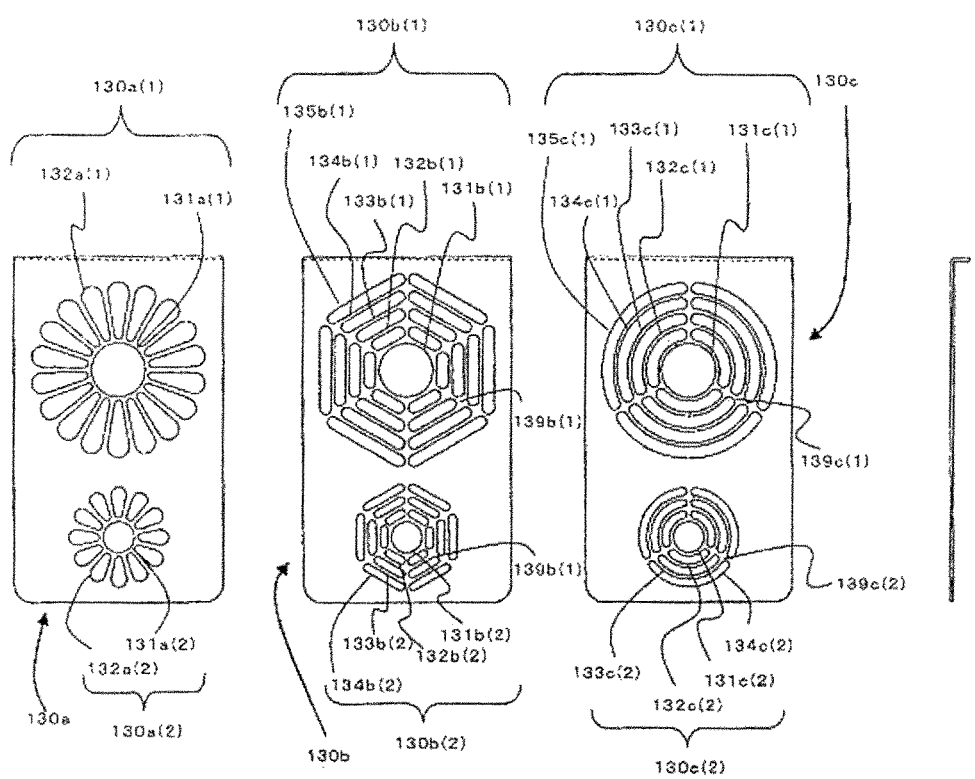
FIGS. 6(a), 6(b), 6(c), 6(d) are schematic views of a plate-shaped opposite electrode which is usable as an opposite electrode according to the present invention.

FIGS. 6(a), 6(b), 6(c), 6(d) are schematic views showing an example of an opposite electrode according to the present invention. Herein, a hole is provided at a plate to form an opposite electrode. FIG. 6(c) is a conceptual view of a plate-shaped opposite electrode 130c having a circular opposite electrode. The relevant opposite electrode includes a first opposite electrode 130c (1) and a second opposite electrode 130c (2). In the first opposite electrode 130c (1), a circular main annular opposite electrode 131c (1) is formed at a center thereof, a circular sub annular opposite electrode 132c (1) is formed at a periphery thereof, and sub annular opposite electrodes 133c (1), 134c (1), and 135c (1) are formed at an outer circumference of the sub annular opposite electrode 132c (1). Further, a connection member 139c (1) is formed between those opposite electrodes. Further, likewise, in the second opposite electrode, a circular main annular opposite electrode 131c (2) is formed at a center thereof, a circular sub annular opposite electrode 132c (2) is formed at a periphery thereof, and sub annular opposite electrodes 133c (2) and 134c (2) are formed at an outer circumference of the sub annular opposite electrode 132c (2). Further, a connection member 139c (2) is formed between those opposite electrodes. With respect to those plate-shaped opposite electrodes, a needle-shaped electrode is placed and used at a suitable position.

FIG. 6(b) is a view showing a schematic configuration of a plate-shaped opposite electrode 130b. In the plate-shaped opposite electrode 130b, a main annular opposite electrode is circular, and a surrounding sub annular opposite electrode is hexagonal. The plate-shaped opposite electrode 130b includes a first opposite electrode 130b (1) and a second opposite electrode 130b (2). A circular main annular opposite electrode 131b (1) is formed at a center of the first opposite electrode 130b (1), a hexagonal sub annular opposite electrode 132b (1) is formed at a periphery thereof, and sub annular opposite electrodes 133b (1), 134b (1), and 135b (1) are formed at an outer circumference thereof. Further, those opposite electrodes are connected via a connection member 139b (1).

Likewise, a circular main annular opposite electrode 131b (2) is formed at a center of the second opposite electrode 130b (2), hexagonal sub annular opposite electrodes 132b (2) to 134b (2) are formed at a periphery thereof, and those electrodes are connected via a connection member 139b (2).

FIG. 6(a) is a view showing a schematic configuration of a plate-shaped opposite electrode 130a. In the plate-shaped opposite electrode 130a, a circular main annular opposite electrode is formed, and an annular sub annular opposite electrode is formed at a periphery thereof. The plate-shaped opposite electrode 130a includes a first opposite electrode 130a (1) and a second opposite electrode 130a (2). A circular main annular opposite electrode 131a (1) is formed at a center of the first opposite electrode 130a (1), and a plurality of sub annular opposite electrodes 132a (1) are formed at a periphery thereof. In FIG. 6(a), although a typical example of the sub annular opposite electrode 132a (1) is shown, an electrode 132a (1) formed around the main annular opposite electrode 131a (1) is also a sub annular opposite electrode. With such a formation, since a member formed between the sub annular opposite electrodes is radially extended from the main annular opposite electrode, in addition to ion wind generated from the main annular opposite electrode, the volume of ion wind successively decreases as being away from the relevant main annular opposite electrode. Like the first opposite electrode, the second opposite electrode 132a (2) includes a main annular opposite electrode 131a (2) at a center thereof and a sub annular opposite electrode 132a (2).

Further, FIG. 6(d) is a common side view of the plate-shaped opposite electrodes 130a to 130c.

As shown in FIG. 7, an ion/ozone wind generation device having a plurality of electrode pairs 110 according to the present embodiment is preferable. Further, FIG. 7 is a conceptual plan view of an ion/ozone wind generation device 100. It is preferable that two electrodes pairs are placed at the left and right sides of an electrode pair located at the center, and the ion wind generation directions of the two left and right electrode pairs intersect with the ion wind generation direction of the center electrode pair. Further, it is more preferable to have an arrangement where the ion winds generated from the respective electrode pair are concentrated on one point. By using such a device, the ion winds generated from the respective electrode pairs can be merged, and thus a larger volume of ion wind can be obtained.

As shown in FIGS. 8(a), 8(b), it is preferable to provide a truncated cone-shaped ion wind guide member 140. Further, FIG. 8(a) is a conceptual front view of an opposite electrode 130 of a relevant device, and FIG. 8(b) is a conceptual side view of an ion/ozone wind generation device 100. With respect to the ion wind generated from the annular opposite electrode 131 located at the innermost of the opposite electrode 130, the ion wind generated from the annular opposite electrode located at the outer side is concentrated (merged) to be sent to an ion wind exhaust nozzle 141, and, thus, to increase the volume of ion wind pushed to the front side. Further, even when such a guide member is provided, since the ion wind generated at the outer side is smaller than the ion wind generated at the innermost, it is not detained and is pushed forward as if suctioned into the center ion wind. The guide member has a shape in which its open cross-sectional area decreases gradually. When such a guide member is provided, the cross-sectional area is reduced with respect to a blowing operation in a case where the ion wind generated from the opposite electrode is even wind or donut wind that does not generate a wind pressure at the center. Therefore, straight ion wind collides against an inner wall of the guide member to generate turbulence, and, thus, to generate a reaction in the inside of the guide member, whereby the wind is weakened. However, when the main ion wind is strong and the sub ion wind is weak, the sub ion wind is weak even when the diameter of the guide member is reduced. Therefore, a collision against the inner wall of the guide member is also weakened naturally, and the main ion wind circumvolutes the sub ion wind, whereby the ion wind is concentrated and exhausted to the outside.

Further, it is preferable that a blower path 150 is provided in the exhaust nozzle 141 of the guide member 140. Herein, the blower path is not specifically limited as long as it can adjust the direction of ion wind exhausted out. However, it is preferable that the blower path is a cylindrical member having the same diameter as the exhaust nozzle 141. Herein, the material of the blower path is not specifically limited, and may be a hose, vinyl chloride pipe, or the like. As will be described below, when a plurality of electrode pairs are provided, the relevant blower path may be used to easily concentrate the ion winds generated from these electrode pairs. Further, when the relevant electrode pair is used in singularity, ions and ozone may be sent out by the relevant blower path to a sterilizing/deodorizing target space or the like.

Figure 9:
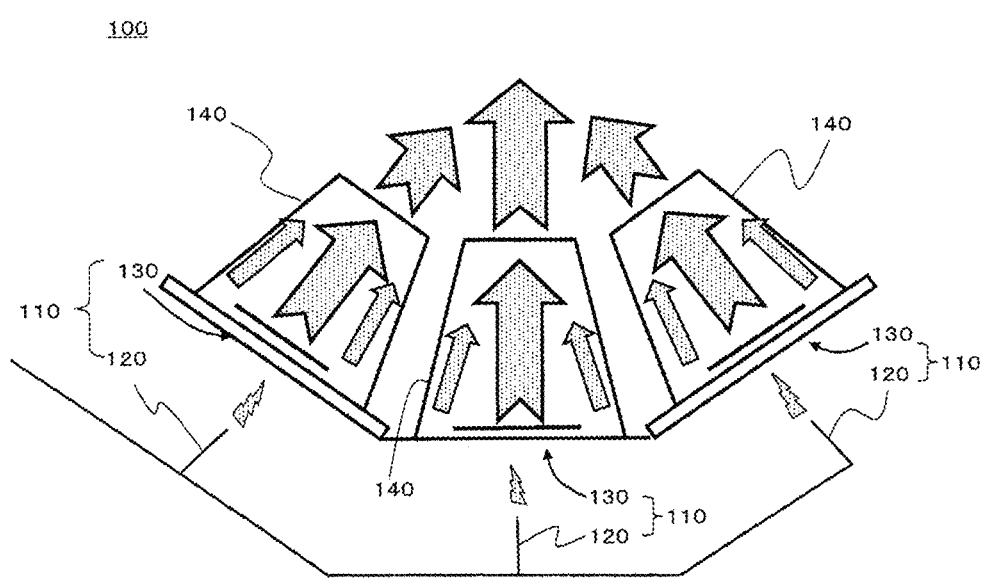
FIG. 9 is a conceptual plan view of the ion/ozone wind generation device 100.

As shown in FIG. 9, it is preferable to provide a plurality of electrode pairs 110 provided with such guide members 140. When three electrode pairs 110 are provided, two electrodes pairs are placed at the left and right sides of an electrode pair located at the center, and the ion wind generation directions of the two left and right electrode pairs respectively intersect with the ion wind generation direction of the center electrode pair. Further, it is preferable to have an arrangement where the ion winds generated from the respective electrode pairs are concentrated on one point. According to this constitution, the ion winds generated from the respective electrode pairs can be merged, thus obtaining a larger volume of ion wind.

As shown in FIGS. 10(a), 10(b), 10(c), it is preferable to provide six electrode pairs 110 provided with a guide member 140 (herein, a needle-shaped electrode is omitted for ease of illustration). FIG. 10(a) is a conceptual plan view of an ion/ozone wind generation device, FIG. 10(b) is a conceptual side view of the ion/ozone wind generation device, and FIG. 10(c) is a conceptual front view of the ion/ozone wind generation device seen from an exhaust nozzle. In this case, a two-stage configuration where a group of three electrode pairs is provided on top and bottom stages, the top and bottom stages are arranged according to the arrangement method in the above-illustrated three electrode pairs (FIG. 10(a)), and the group of the three electrode pairs is placed to merge the ion wind generated from a group of the relevant electrode pair (FIG. 10(b)). Herein, it is preferable to have an arrangement where the electrodes are arranged such that the ion winds generated from the respective electrode pairs are concentrated on one point. Namely, the electrodes are placed at an angle to concentrate the ion wind generated from the electrode pair located at the center of the top and bottom stages, whereby the ion winds generated from the respective electrode pairs can be merged, thus obtaining a large volume of ion wind.

According to the ion/ozone wind generation device 100, although a sufficient volume of ion wind can be obtained, this device has left something to be desired in terms of miniaturization and achievement of portability. Thus, as another embodiment of a sterilizing/deodorizing device according to the present invention, there will be detailed an ion/ozone wind generation device 100 which can generate ion wind with lower voltage (that is, can be further miniaturized) and, at the same time, can stably generate stronger ion wind, as compared to the above-described ion/ozone wind generation device 100. This embodiment is just one example, and other embodiments or various modifications thereof that may occur to those skilled in the art belongs to the technical scope of the present invention (specific modifications will be described below). Further, it should not be understood in a limited sense that embodiments and modifications thereof disclosed as examples in the present specification are applied to specific ones, and any combination may be made. For example, it should be understood that a modification of a certain embodiment is a modification of another embodiment, and even when a certain modification and another modification are described independently of one another, it should be understood that a combination of the relevant certain modification and the relevant another modification is also described. Further, numerical values as specific examples shown in the embodiments and the modifications thereof (for example, a diameter and a length/thickness of a discharge electrode or an opposite electrode, a voltage difference between the discharge electrode and the opposite electrode, and a clearance between the discharge electrode and the opposite electrode) are just examples, and it should be understood that they may be suitably modified without significantly departing from the scope of each embodiment and modification thereof.

A schematic configuration of the ion/ozone wind generation device 100 according to the present embodiment is shown in FIGS. 11(a), 11(b), 11(c), 11(d). The ion/ozone wind generation device 100 according to the present embodiment is mainly constituted of one main electrode pair and six sub-electrode pairs provided surrounding the main electrode pair. As described above, the electrode pair is a pair of electrodes having a discharge electrode (a needle-shaped electrode in the present embodiment) and an opposite electrode, and while the main electrode pair has an annular opposite electrode 130a (hereinafter referred to as a first opposite electrode 130a) as the opposite electrode, the six sub-electrode pairs have annular opposite electrodes 130b to 130g (hereinafter referred to as second opposite electrodes 130b to 130g) as the opposite electrodes. Any of the opposite electrodes are constituted of a plate-shaped member and/or a linear member.

In the ion/ozone wind generation device 100 according to the present embodiment, the first opposite electrode 130a and the six second opposite electrodes 130b to 130g all have the same shape (substantially annular shapes having the same diameter). Further, in the ion/ozone wind generation device 100 according to the present embodiment, the second opposite electrodes 130*b* to 130*g* are arranged adjacent to each other along the outer circumference of the first opposite electrode 130*a*. Consequently, a virtual circle S (shown by a dashed line in FIG. 11(*b*)) inscribed on the second opposite electrodes 130*b* to 130*g* is formed outside the second opposite electrodes 130*b* to 130*g*.

More specifically, when a substantially regular hexagonal shape is assumed, the second opposite electrodes 130*b* to 130*g* are provided adjacent to each other so that the centers of the six second opposite electrodes 130*b* to 130*g* correspond to the vertices of the relevant substantially regular hexagonal shape. In other words, in the ion/ozone wind generation device 100 according to the present embodiment, the second opposite electrodes 130*b* to 130*g* are arranged so that the outer circumferences of the adjacent opposite electrodes are abutted against each other. For example, the outer circumference of the second opposite electrode 130*b* is abutted against the outer circumferences of the second opposite electrodes 130*c* and 130*g* adjacent to the second opposite electrode 130*b*. Further, it is possible to define the first opposite electrode 130*a* as being provided to be in contact with the relevant second opposite electrodes 130*b* to 130*g* (that is, to be placed at the center of the substantially regular hexagonal shape assumed by the second opposite electrodes 130*b* to 130*g*). The second opposite electrodes 130*b* to 130*g* is not necessarily adjacent to (abutted against) the opposite electrode adjacent thereto and may be in a state in proximity to it. However, if the second opposite electrodes 130*b* to 130*g* are separated too much, the force of wind generated from the ion/ozone wind generation device 100 is lowered. Thus, in each of the second opposite electrodes 130*b* to 130*g*, a distance between the outer circumferences of the adjacent opposite electrodes (in particular, the shortest distance) is preferably not more than the diameter of each of the second opposite electrodes 130*b* to 130*g* (or not more than 1/n of the diameter (n is a natural number)). The first opposite electrode 130*a* is not necessarily in contact with all the second opposite electrodes 130*b* to 130*g* and may be in a state in proximity to them; however, it is preferable that the first opposite electrode 130*a* is in contact with at least some of the second opposite electrodes 130*b* to 130*g* (also in this case, it is preferable that the shortest distance between outer circumferences is not more than the diameters of the first opposite electrode 130*a* and the second opposite electrodes 130*b* to 130*g* or 1/n of the diameter (n is a natural number)).

The first opposite electrode 130*a* and the second opposite electrodes 130*b* to 130*g* are provided with the needle-shaped electrode 120 (in particular, needle-shaped electrodes 120*a* and 120*b* to 120*g* serving as discharge portions in the respective opposite electrodes) as paired electrodes on a discharge side to form a main electrode pair and a sub-electrode pair. Each opposite electrode according to the present embodiment (the first opposite electrode 130*a* and the second opposite electrodes 130*b* to 130*g*) have a double annular structure as described above, and a main annular electrode and a sub annular electrode provided surrounding the main annular electrode are fixed in a conductive state through a bridge. Here, the functions of the main annular electrode, the sub annular electrode, and the bridge and the principle of generation of ion wind using a double annular electrode having them will be omitted since it has already been described above. Each opposite electrode (the first opposite electrode 130*a* and the second opposite electrodes 130*b* to 130*g*) may not have the double annular structure, and some of or all the opposite electrodes may have a single annular structure (or a multiple annular structure having triple or more rings) or a spiral structure (a specific mode of the spiral structure will be described below).

Next, the operations and effects in the generation of ion wind in the ion/ozone wind generation device 100 according to the present embodiment will be described with reference to FIG. 12. As a supplement, although FIG. 12 may show that the opposite electrodes are located in different planes for ease of imaging the operations and effects, even if the opposite electrodes are located in the same plane, similar operations and effects are obtained.

According to the ion/ozone wind generation device 100 of the present embodiment, by virtue of the provision of the constitution in which the second opposite electrode 130*b* to 130*g* are provided surrounding the periphery of the first opposite electrode 130*a* nearly around the first opposite electrode 130*a* (near the center of the virtual circle S), ion wind generated by the main electrode pair is pushed to the front side while being pushed from behind by tailwind of ion wind generated by the sub-electrode pair, and therefore, the ion wind generated by the main electrode pair is transmitted to a target object without reducing the force thereof (a protective effect by the sub-electrode pair). Namely, if each electrode pair has a smaller shape (in which, for example, the diameter of the opposite electrode is approximately 1 cm (a preferable range is from 5 mm to 5 cm), a clearance between the needle-shaped electrode and the opposite electrode is approximately 1 to 2 cm (a preferable range is from 1 mm to 2 cm), and a potential difference between the needle-shaped electrode and the opposite electrode is approximately 3 to 100 volts), a sufficient volume of ions wind can be obtained.

The ion/ozone wind generation device 100 according to the present embodiment is configured such that the periphery of the first opposite electrode 130*a* is surrounded by the adjacent second opposite electrodes 130*b* to 130*g* (the second opposite electrodes are provided to be adjacent to the first opposite electrode 130*a* as close as possible). According to this configuration, in the ion wind generated by each electrode pair, the rate at which the relevant ion wind is in contact with the ion wind generated by the adjacent electrode pair increases larger than the rate at which the relevant ion wind is in contact with static ambient air (namely, the generated ion wind becomes hard to be in contact with the static ambient air, thus reducing resistance due to friction with ambient air).

Since the entire periphery of the ion wind generated by the first opposite electrode 130*a* is particularly surrounded by another ion wind, the ion wind becomes more hard to be in contact with ambient air, thus further increasing the protective effect by the sub-electrode pair as described above. Thus, in the ion/ozone wind generation device 100 according to the present embodiment, when the entire ion wind jetted therefrom is viewed, in the ion wind jetted from the ion/ozone wind generation device 100, the area in contact with static ambient air is reduced, so that the ion wind becomes hard to be affected by the friction with ambient air. At the same time, the effect of protecting the center ion wind (the ion wind generated by the main opposite electrode pair) by the surrounding ion air (the ion wind generated by the sub opposite electrode pair) is obtained. Therefore, stronger ion wind can be transmitted to a distant target object. Thus, the respective opposite electrodes are positioned adjacent to each other to reduce a gap existing between the opposite electrodes as much as possible, so that a larger electrode pair is provided in a limited space (or the number of the opposite electrodes is increased), whereby a larger volume of ion wind may be allowed to be generated.

As in the ion/ozone wind generation device 100 according to the present embodiment, when all the opposite electrodes (the first opposite electrode 130*a* and the second opposite electrodes 130*b* to 130*g*) have the same shape, the volume of ion wind generated by the electrode pairs including the main electrode pair and the respective sub-electrode pair is large to a certain extent (a port ion having a small volume of ion wind is not locally formed). Further, the second opposite electrodes 130*b* to 130*g* have the same shape, so that in the ion wind generated by the sub-electrode pair (in particular, the second opposite electrodes 130*b* to 130*g*), the area in contact with ambient air is substantially the same without depending on the installation position of the sub-electrode pair; therefore, local volume unevenness in the entire ion wind is further reduced. Accordingly, according to this constitution, when the entire ion/ozone wind generation device 100 is viewed, more stable ion wind having a large volume can be obtained.

As show in FIGS. 11(*a*), 11(*b*), 11(*c*), 11(*d*), in the ion/ozone wind generation device 100 according to the present embodiment, the respective opposite electrodes in the main electrode pair and the sub-electrode pair are made adjacent to each other to allow the opposite electrodes to be conducted (similarly, the needle-shaped electrodes 120*a* to 120*g* are allowed to be conducted). According to this constitution, the respective opposite electrodes (the respective needle-shaped electrodes) can be equipotential, so that it is possible to facilitate control of a voltage of the entire sterilizing/deodorizing device and, at the same time, stabilize the generation of ion wind (however, the present invention is not limited thereto, and the respective opposite electrodes (the needle-shaped electrodes) may be unable to be conducted).

According to the ion/ozone wind generation device 100 of the present embodiment, a single needle-shaped electrode is provided with respect to a single opposite electrode (double annular opposite electrode) (the needle-shaped electrode is provided in a one-to-one fashion), and corona discharge may be generated in each electrode pair (the ion wind may be generated in a plurality of electrode pairs); therefore, the operational stability of the entire ion/ozone wind generation device 100 is maintained, and, at the same time, large volumes of ion winds are obtained by the respective electrode pairs and further combined, whereby a large volume of ion wind can be obtained stably.

As described above, according to the ion/ozone wind generation device 100 of the present embodiment, the virtual circle that can generate ion wind is assumed, and the ion/ozone wind generation device 100 is provided with a plurality of sub-electrode pairs as electrode pairs in which opposite electrodes are located adjacent or proximate to each other on the circumference of the virtual circle and a main electrode pair as an electrode pair in which an opposite electrode is located in the circumference of the virtual circle, whereby stronger ion wind can be generated more stably. Here, in FIGS. 11(*a*), 11(*b*), 11(*c*), 11(*d*), the size of the annular opposite electrode in the main electrode pair and the sizes of the annular opposite electrodes in the sub-electrode pair are all the same, and the six annular opposite electrodes in the sub-electrode pair are provided circumscribing the annular opposite electrode in the main electrode pair. However, the shape and the positional relation of the opposite electrode pairs are not limited thereto, and various configurations can be considered as the configuration capable of exerting the above effects (for example, the protective effect by the sub-electrode pair).

For example, as shown in FIGS. 13(*a*), 13(*b*), 13(*c*), 13(*d*), the annular opposite electrode in the sub-electrode pair may have a diameter (an annular diameter) smaller than the annular opposite electrode in the main electrode pair, and the annular opposite electrode in the sub-electrode pair may be placed circumscribing the annular opposite electrode in the main electrode pair (so that the respective annular opposite electrodes are adjacent to each other).

Figures 14A, 14B, 14C, 14D:
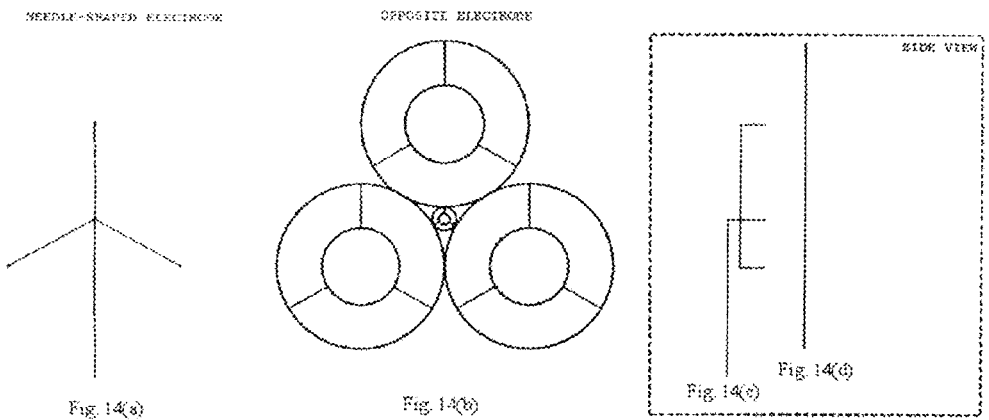
FIGS. 14(a), 14(b), 14(c), 14(d) are conceptual views of a needle-shaped electrode and an opposite electrode in another embodiment.

On the other hand, as shown in FIGS. 14(*a*), 14(*b*), 14(*c*), 14(*d*), the annular opposite electrode in the sub-electrode pair may have a diameter (an annular diameter) larger than the annular opposite electrode in the main electrode pair, and the annular opposite electrode in the sub-electrode pair may be placed circumscribing the annular opposite electrode in the main electrode pair (so that the respective annular opposite electrodes are adjacent to each other).

Figures 15A, 15B, 15C, 15D:
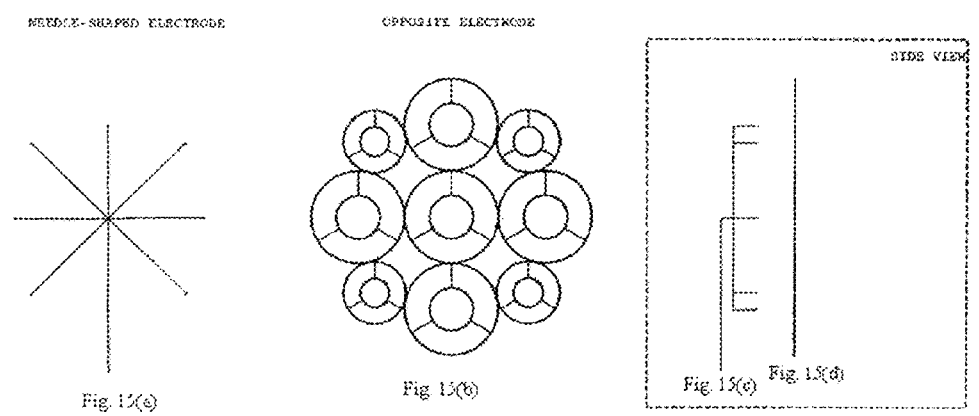
FIGS. 15(a), 15(b), 15(c), 15(d) are conceptual views of a needle-shaped electrode and an opposite electrode in another embodiment.

Further, as shown in FIGS. 15(*a*), 15(*b*), 15(*c*), 15(*d*), the annular opposite electrodes in a plurality of the sub-electrode pairs may not have the same shape, and while the annular opposite electrodes in some sub-electrode pairs each may have a large diameter (annular diameter), the annular opposite electrodes in the other sub-electrode pairs each may have a smaller diameter (annular diameter).

Further, as shown in FIGS. 16(*a*), 16(*b*), 16(*c*), 16(*d*), 16(*e*), 16(*f*), 16(*g*), the annular opposite electrode in the main electrode pair and the annular opposite electrode in the sub-electrode pair may be placed not on the same plane (including the annular opposite electrode in the main electrode pair) but on different planes (for example, in FIGS. 16(*a*), 16(*b*), 16(*c*), 16(*d*), 16(*e*), 16(*f*), 16(*g*), the main electrode pair is arranged on the more front side (ion air blowing direction) than the sub-electrode pair).

Further, as shown in FIGS. 17(*a*), 17(*b*), 17(*c*), 17(*d*), the number of the main electrode pairs is not limited to one, but a plurality of the main electrode pairs may be provided (for example, in FIGS. 16(*a*), 16(*b*), 16(*c*), 16(*d*), 16(*e*), 16(*f*), 16(*g*), the number of the first opposite electrodes 130*a* is three).

Figures 18A, 18B:
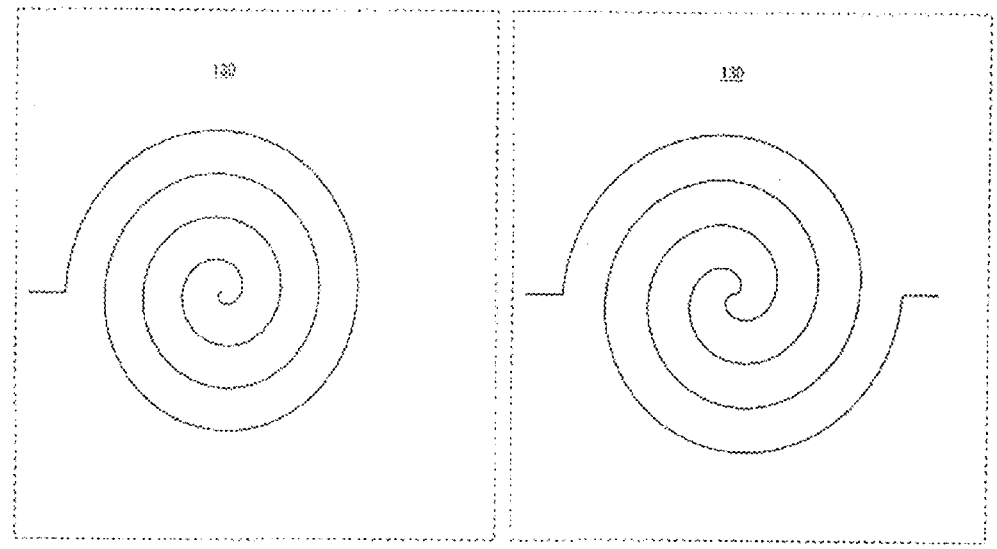
FIGS. 18(a), 18(b) are conceptual views of an opposite electrode in another embodiment.

Here, as shown in FIGS. 18(*a*), 18(*b*), the shape of each opposite electrode in the main electrode pair and/or the sub-electrode pair is not limited to a polygonal shape, a circular shape, and a substantially circular shape and may be a spiral shape (the number of turns and the turning width are just examples). Here, a difference between the spiral shape shown in FIG. 18(*a*) and the spiral shape shown in FIG. 18(*b*) is the presence or absence of the end point of a spiral in the formation of the spiral shape toward the center. In particular, if each opposite electrode has the spiral shape shown in FIG. 18(*b*), there is an advantage that the opposite electrodes are easily conducted. If the opposite electrode has such a spiral shape, as compared to the case of a multiple annular structure, there is concern that unevenness may occur in corona discharge. However, as a supplement, as the opposite electrode itself is miniaturized (for example, the diameter of the opposite electrode is approximately 1 cm), a distance error between each portion of a spiral conductor and a needle-shaped electrode (peeling from a multiple annular structure) causing the occurrence of the unevenness is reduced, and therefore, equivalent effects to those of the multiple annular structure can be obtained more easily.

Figures 19A, 19B:
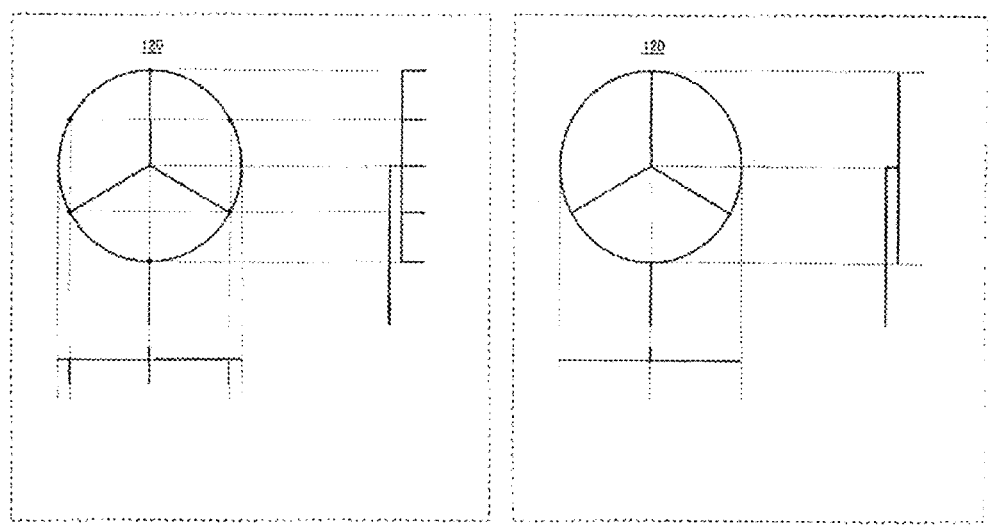
FIGS. 19(a), 19(b) are conceptual views of a needle-shaped electrode in another embodiment.

As shown in FIGS. 19(*a*), 19(*b*), an electrode on the discharge side (for example, a needle-shaped electrode) may be the annular discharge electrode 120 (FIG. 19(*b*)) and may be merely the annular discharge electrode 120 (FIG. 19(a)) in which a needle-shaped electrode is bridged annularly.

The ion/ozone wind generation device according to the present invention may be used not only as a sterilizing/deodorizing device, but also an ionized water/sterilized water producing device.

Since the device according to the present invention generates ions and/or ozone by corona discharge and also generates a large volume of ion wind, they are carried by the ion wind and brought into contact with a sterilizing/deodorizing target object, so that the device can be used as an ion/ozone generation device. Further, since a large volume of ion wind is generated, ions and ozone are generated and sent out to a space in which the sterilizing/deodorizing target object is placed without using a pump. Accordingly, the device can be used as an external sterilizing/deodorizing device.

When the ion/ozone wind generation device according to the present invention can also be used to sterilize/deodorize seawater and freshwater based on air stone/nano-bubble air supply. Namely, since a nano-bubbler generator requires air injection, the ion wind guide member and the blower path are combined to be used as a nano-bubble air supply source, so that the ion/ozone wind is reacted in water to simply generate ionized water/sterilized water. Consequently, the device can be used for the purpose of beauty such as a whitening effect using a bleaching action being the characteristics of ozone, or to remove fat from the base of pores by the sterilizing/cleansing of a skin using a synergy effect of ozone water and nano-bubbles. Further, the device can be used to sterilize/deodorize an aquarium for breeding fish and shellfish, to sterilize a culture fluid for hydroponic cultivation, to generate sterilized water in kitchen using a discharge pressure of a tap water as a power source, and to safely and inexpensively perform effective sterilization/deodorization or resolution of fat by ozone water.

Further, in order to miniaturize the ion/ozone wind generation device (for example, in order to reduce the outside dimension of the ion/ozone wind generation device to approximately 7 cm in length, 7 cm in width, and 3 cm in height, that is, miniaturize the device to the extent that the device can be easily held by one hand), if a space of an electrode configuration is saved (for example, if the opposite electrodes each having a diameter of approximately 1 cm (a preferable range is from 5 mm to 5 cm) are arranged as shown in FIGS. 11(a), 11(b), 11(c), 11(d) and a clearance between the needle-shaped electrode and the opposite electrode is approximately 1 to 2 cm (a preferable range is from 1 mm to 2 cm)), the ion/ozone wind generation device can be carried in a pocket of the clothing or a bag, and therefore, a user can easily use the ion/ozone wind generation device if necessary (for example, when the user wants to remove a source of offensive odor adhering to the user's own body or the clothing) or in as close proximity to a sterilizing/deodorizing target object as possible. In addition, if the ion/ozone wind generation device is miniaturized, the following usage can be easily achieved. Namely, the ion/ozone wind generation device is permanently installed in facility equipment in amusement facilities such as restaurants, game centers, and pachinko halls (for example, on a counter in a restaurant and a gap between game machine facilities in an amusement facility), and a source of offensive odor from a neighbor (for example, sidestream smoke of cigarettes) is partitioned to provide a personal cleaned air space for each customer.

Embodiments

Next, although the present invention will be more specifically described with reference to Examples and Comparative Examples, the present invention is not limited these examples.

(Measurement Method and Measurement Conditions)

In the following Example 1, Example 2, Comparative Example 1, Comparative Example 2, and Comparative Example 3, ion wind was generated using an ion wind generation device provided with an opposite electrode having a shape shown in FIG. 20, 21, 22, 23, or 24, and the velocity of the ion wind was measured by a method shown in FIG. 25. The electrode size of each device is as shown in the following Table 1. A potential difference (applied voltage) between a needle-shaped electrode and the opposite electrode in the generation of the ion wind was 7000 [V] (current: 500 µA), and a pedestal on which an anemometer shown in FIG. 5 was placed had a height of 39 mm. In a measurement environment, the temperature was 25° C., and the humidity was 60%.

Example 1

Figure 20:
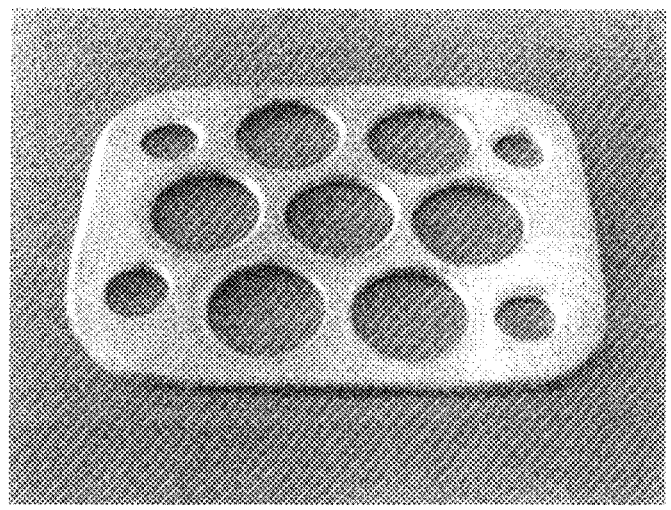
FIG. 20 is a structural view 1 of an opposite electrode in an experimental apparatus.

As shown in FIG. 20, the structure of the present example has a main electrode pair and a plurality of sub-electrode pairs located surrounding the main electrode pair, and each electrode pair has a planar and annular shape or the like.

Example 2

Figure 21:
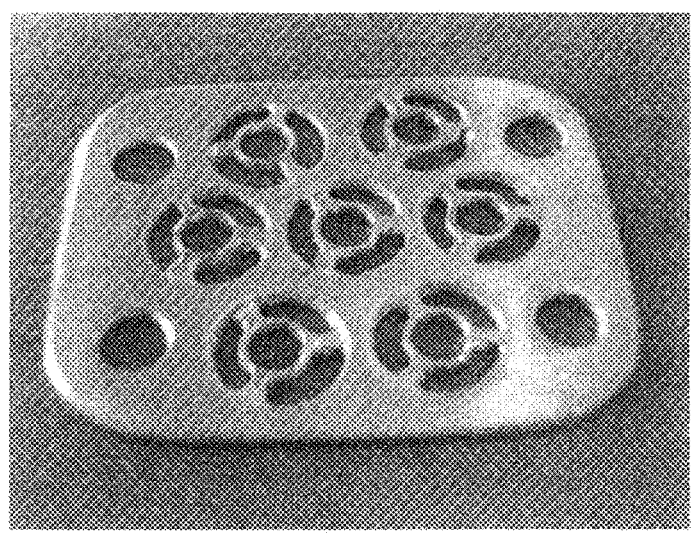
FIG. 21 is a structural view 2 of an opposite electrode in the experimental apparatus.

As shown in FIG. 21, the structure of the present example is similar to the structure of Example 1 except that each opposite electrode has a main annular opposite electrode and a sub annular opposite electrode.

Comparative Example 1

Figure 22:
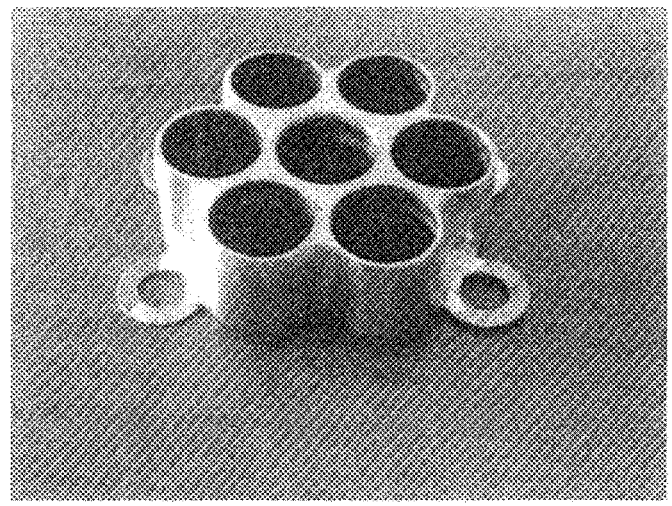
FIG. 22 is a structural view 3 of an opposite electrode in the experimental apparatus.

As shown in FIG. 22, in the structure of the present example, a plurality of pairs of electrodes adjacent to each other, surrounding a pair of electrodes are provided. Further, an opposite electrode has a cylindrical shape.

Comparative Example 2

Figure 23:
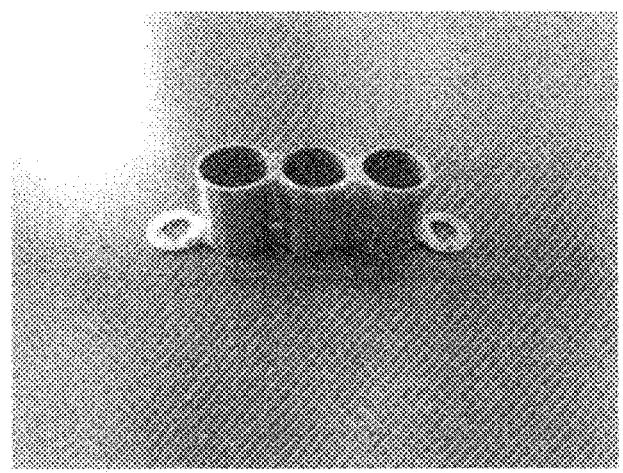
FIG. 23 is a structural view 4 of an opposite electrode in the experimental apparatus.

As shown in FIG. 23, in the structure of the present example, a plurality of pairs of electrodes arranged in series are provided. Further, an opposite electrode has a cylindrical shape.

Comparative Example 3

Figure 24:
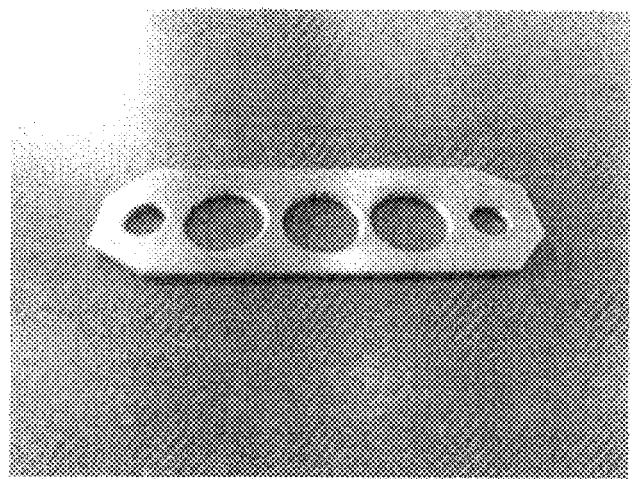
FIG. 24 is a structural view 5 of an opposite electrode in the experimental, apparatus.
Figure 25:
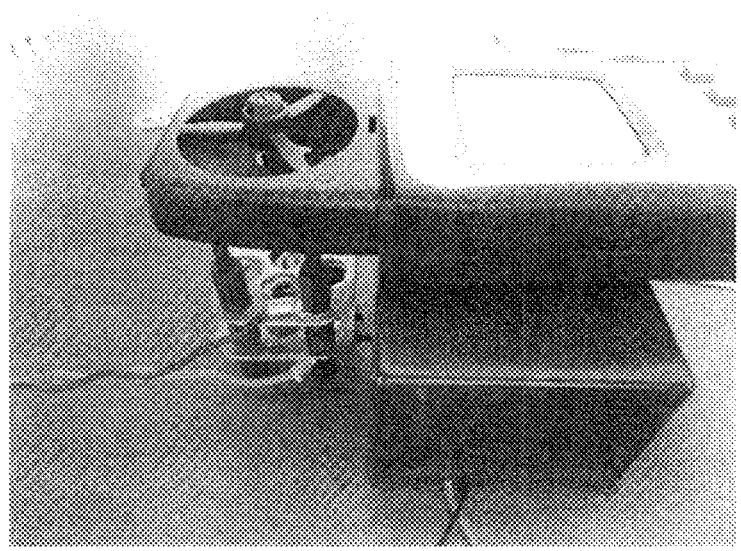
FIG. 25 is an explanatory view of a measurement method using the experimental apparatus.

As shown in FIG. 24, in the structure of the present example, a plurality of pairs of electrodes arranged in series are provided. Further, each electrode pair has a planar and annular shape.

TABLE 1

| | Electrode size of each device | | |
|---|---|---|---|
| | Inner diameter of opposite electrode [mm] | Tube length of opposite electrode [mm] | Clearance between needle-shaped electrode and opposite electrode [mm] |
| Example 1 | 8 | — | 10 |
| Example 2 | 8 | — | 10 |

TABLE 1-continued

Electrode size of each device

|  | Inner diameter of opposite electrode [mm] | Tube length of opposite electrode [mm] | Clearance between needle-shaped electrode and opposite electrode [mm] |
|---|---|---|---|
| Comparative Example 1 | 8 | 10 | 10 |
| Comparative Example 2 | 8 | 10 | 10 |
| Comparative Example 3 | 8 | — | 10 |

(Measurement Results)

The above measurement results are shown in the following Table 2. As shown in Table 2, it can be seen that the velocity of the ion wind generated by the ion wind generation device of Example 1 is significantly larger than the velocity of the ion wind generated by the ion wind generation devices of Comparative Examples 1 to 3.

Although specifically described below, from this measurement results, it can be said that the effect of significantly amplifying the wind force can be provided only by the fact (A) that a main electrode pair and a plurality of sub-electrode pairs located surrounding the relevant main electrode pair are provided, and the fact (B) that each electrode pair has a planar and annular shape or the like, and if even one of (A) and (B) is lacked, the effect of amplifying the wind force is small.

More specifically, in comparing Comparative Example 1 and Comparative Example 2, when an opposite electrode has a cylindrical shape, even if arrangement of a plurality of electrode pairs is changed from the serial arrangement to arrangement in which a plurality of sub-electrode pairs located surrounding a main electrode pair are provided, the velocity is increased only by 0.1 m/s, so that it can be seen that the effect of amplifying the wind force is small. Meanwhile, in comparing Example 1 and Comparative Example 3, if each electrode pair is formed into a planar and annular shape or the like, when arrangement of a plurality of electrode pairs is changed from the serial arrangement to arrangement in which a plurality of sub-electrode pairs located surrounding a main electrode pair are provided, the velocity is significantly increased by 0.3 m/s, so that it can be seen that the effect of amplifying the wind force is large.

Further, in comparing Comparative Example 2 and Comparative Example 3, when the arrangement of a plurality of electrode pairs is the serial arrangement, even if a shape of an opposite electrode is changed from a cylindrical shape to a planar and annular shape or the like, the velocity is increased only by 0.1 m/s, so that it can be seen that the effect of amplifying the wind force is small. Meanwhile, in comparing Example 1 and Comparative Example 1, when the arrangement of a plurality of electrode pairs is the arrangement in which a plurality of sub-electrode pairs located surrounding a main electrode pair are provided, if a shape of an opposite electrode is changed from a cylindrical shape to a planar and annular shape or the like, the velocity is significantly increased by 0.3 m/s, so that it can be seen that the effect of amplifying the wind force is large.

As described above, in the ion/ozone wind generation device according to Example 1 of the present invention, it can be seen that the wind force generated is significantly large as compared to the case of the devices according to Comparative Examples 1 to 3. In addition, it can be seen that the effect of amplifying ion wind based on the arrangement in which a plurality of sub-electrode pairs located surrounding a main electrode pair are provided is made significant by forming each electrode pair into a planar and annular shape or the like.

In comparing Example 1 and Example 2, it can be seen that when each opposite electrode has a main annular opposite electrode and a sub annular opposite electrode, the effect of more significantly amplifying wind force is provided.

TABLE 2

Table 2 Velocity in Examples and Comparative Examples

|  | Velocity [m/s] |
|---|---|
| Example 1 | 1.0 |
| Example 2 | 1.3 |
| Comparative Example 1 | 0.7 |
| Comparative Example 2 | 0.6 |
| Comparative Example 3 | 0.7 |

Further, an opposite electrode was embodied based on the description of the Patent Literature 6 (in particular, FIGS. 2(a), 2(b)), and the velocity of ion wind was measured in a similar measurement environment by a similar measurement method. At that time, the velocity was approximately 0.5 m/s. It can be considered that this is because, since opposite electrodes are separated too much (in other words, since the shortest distance between the outer circumferences of the opposite electrodes is not less than a diameter of the opposite electrodes thereof), ion winds generated from the respective opposite electrodes are hard to be synthesized. Furthermore, an opposite electrode was embodied based on the description of the Patent Literature 9 (in particular, FIGS. 1(a), 1(b)), and the velocity of ion wind was measured in a similar measurement environment by a similar measurement method. At that time, the velocity was approximately 0.7 m/s. It can be considered that this is because, since the opposite electrode is not annular and, at the same time, planar normal vectors in the respective opposite electrode are not directed in substantially the same direction, discharge unevenness is apt to occur in each opposite electrode, and, in addition, the force of ion wind generated from the opposite electrode is not uniformized, so that due to such an influence, the ion winds generated from the respective opposite electrodes are not synthesized optimally.

(Modifications According to Opposite Electrode)

The opposite electrode (for example, FIGS. 11(a), 11(b), 11(c), 11(d)) shown as a conceptual view in the above description has the image of being processed by forming the first opposite electrode 130a and the second opposite electrodes 130b to 130g as planar and annular separate electroconductive members and joining (for example, soldering) the separate electroconductive members so that the electroconductive members are adjacent to each other (hereinafter, this processing image is referred to as joining processing). On the other hand, the opposite electrode (for example, FIGS. 20 and 21) shown as a structural view in each Example has the image of being produced by perforating annular through holes in a single plate-shaped electroconductive member (hereinafter, this processing image is referred to as perforation processing). Thus, due to a difference in the processing method, the entire structure of an opposite electrode may be different as shown in this example. However, as described above using FIGS. 1(a), 1(b), considering a basic mechanism for generating corona discharge, since a ratio of generation of corona discharge is highest at a portion of an opposite electrode (that is, an inner circumferential edge portion in an annular opposite electrode) in which a distance between a needle-shaped electrode and the opposite electrode is shortest, in an opposite electrode processed by the joining processing or the perforation processing, good corona discharge is nevertheless generated at the inner circumferential edge portion in the annular opposite electrode. In the actual production of an opposite electrode, although the opposite electrode can be easily formed by the perforation processing, rather than the joining processing, this is because as long as a plate-shaped opposite electrode is assumed (if a cylindrical opposite electrode is assumed, it can be said that when the opposite electrode is formed by perforation processing, such waste that the opposite electrode itself is increased in size is apt to occur, and, at the same time, the perforation processing itself becomes difficult). Namely, even in the actual production of an opposite electrode, it can be said that it is more advantageous to form the opposite electrode into a plate shape than to form the opposite electrode into a cylindrical shape.

However, when a mechanism for generating ion wind based on corona discharge is considered, it is assumed that the ion wind generated in the case of forming an opposite electrode by perforation processing is reduced more than that in the case of forming the opposite electrode by joining processing. Here, as a common mechanism of generation of ion wind, the ion wind is considered as an airflow that is generated from a needle-shaped electrode to an opposite electrode when ions emitted from the needle-shaped electrode during corona discharge repeat a collision with air molecules while migrating to the opposite electrode. However, the present invention pays attention to the effect of increasing ion wind due to a negative pressure generated by the relevant air flow and an intake flow of ambient air into a space in which the negative pressure is generated. For example, as is evident from a position where the ion wind is generated, shown in FIGS. 1(a), 1(b), when corona discharge is generated at an inner circumferential edge portion in an annular opposite electrode, although ion wind is pushed toward the front direction from the vicinity of the inner circumferential edge portion, at this time, a negative pressure is generated on the back side of an annular portion of the opposite electrode (a surface on the side not facing a needle-shaped electrode). Then, in particular ambient air surrounding an outer circumference of an opposite electrode is sucked toward the space in which the negative pressure is generated, so that the force of ion wind pushed toward the front direction by the sucked ambient air is increased (in this respect, it can be said that it is more advantageous to form the opposite electrode into a plate shape than to form the opposite electrode into a cylindrical shape).

Based on the understanding of such a mechanism for generating ion wind, a preferred embodiment in the case of forming an opposite electrode by perforation processing will be detailed. First, FIG. 26 (left) is a conceptual view showing a case where the opposite electrode shown in FIG. 11(b) is formed by perforation processing. As shown in the same drawing, the single planar electroconductive member 130 is perforated to form annular through holes corresponding to the first opposite electrode 130a and the second opposite electrodes 130b to 130g, whereby the entire opposite electrode is formed. Here, in this example, in view of errors that will occur in the perforation of the annular through holes, the first opposite electrode 130a and the second opposite electrodes 130b to 130g are arranged to be spaced apart from one another at intervals of at least approximately several mm (1 to 3 mm). Further, in this example, the single planar electroconductive member 130 is formed into a substantially square shape, whereby, for example, holes for pivotally supporting the electroconducive member 130 at the four corners of the relevant substantially square shape (holes used for assembling an experimental apparatus as shown in FIGS. 20 and 25) can be provided.

Figure 26:
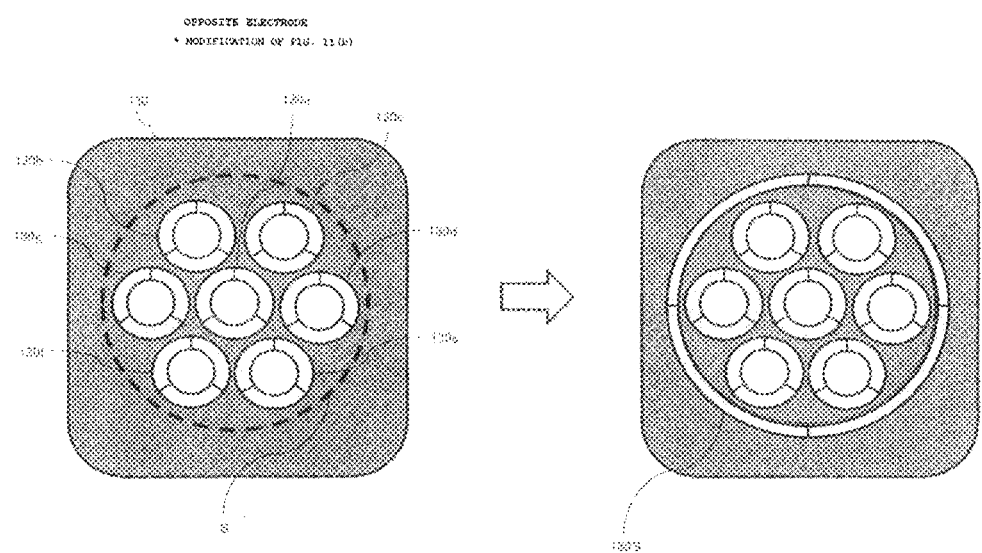
FIG. 26 is a conceptual view of a variation in an opposite electrode.

Needle-shaped electrodes serving as discharge portions with respect to the respective opposite electrodes in the first opposite electrode 130a and the second opposite electrodes 130b to 130g are provided, and if a potential difference is generated between the relevant electrodes, corona discharge is generated mainly at an inner circumferential edge portion in the first opposite electrode 130a and the second opposite electrodes 130b to 130g (in this example, although a double annular structure is employed, corona discharge is generated at both an inner circumferential edge portion in an inner annular structure and an inner circumferential edge portion in an outer annular structure). When ion wind is pushed toward the front direction from the vicinity of the inner circumferential edge portion, a negative pressure is generated on the back side of an annular portion of the opposite electrode (a surface on the side not facing the needle-shaped electrode) (up to this point, the operation is similar to the operation shown in FIG. 12). However, when ambient air surrounding a periphery 3 of the opposite electrode and existing between the opposite electrode and the needle-shaped electrode is to be particularly sucked toward a space in which the negative pressure is generated, it is assumed that the ambient air is shielded by the electroconductive member 130. Thus, as shown in FIG. 26 (right), it is preferable to provide a suction hole 130S to allow the relevant ambient air to be sucked to pass through the electroconductive member 130. If a distance between the suction hole 130S and the outer circumferences of the second opposite electrode 130b to 130g is too large, a distance between the relevant ambient air to be sucked and the relevant space in which the negative pressure is generated is increased, and, at the same time, a deviation between the ion wind generation direction and a moving direction of the relevant ambient air to be sucked is increased. Due to this, the effect of increasing the force of ion wind may be reduced. Thus, it is preferable that the distance between the suction hole 130S and the outer circumferences of the second opposite electrodes 130b to 130g is not more than the diameters of the second opposite electrodes 130b to 130g (or not more than 1/n of the diameter (n is a natural number)).

Based on the above, when an opposite electrode is formed by perforation processing, the suction hole 130S is provided surrounding the outside of the second opposite electrodes 130b to 130g (in a certain second opposite electrode, the side not adjacent to the other opposite electrodes), whereby it is possible to expect the effect of sucking ambient air surrounding an outer circumference of an opposite electrode and the effect of increasing the force of ion wind pushed toward the front direction from the opposite electrode by the relevant sucking effect based on the mechanism for generating ion wind, which is paid attention to by the present invention. Since ion wind containing ozone is diluted by ambient air in addition to the effect of increasing the force of ion wind, there is produced a merit that reduces a risk of adverse effects on the human body. Namely, the present modification (in particular, the modification in which an opposite electrode is formed into a plate shape) can provide an opposite electrode which can generate ion wind well (can generate good ion wind) without separately providing an apparatus for increasing the force of ion wind and an apparatus for removing ozone and can easily form an opposite electrode in the actual production of the opposite electrode.

In this example, although only the point that the suction hole 130S is a circumferential hole is exemplified, the present invention is not limited thereto. Namely, since a more preferred shape is obtained when an opposite electrode is formed by joining processing, various forming methods whose main purpose is to form the opposite electrode into a shape similar to the relevant shape can be used. For example, in the second opposite electrodes 130b to 130g, the suction hole 130S may be provided to be curved along a circular arc on the side not adjacent to other opposite electrodes. Alternatively, the suction hole 130S may be provided to be wound surrounding the second opposite electrodes 130b to 130g, or, for example, a plurality of substantially triangular holes may be provided along the relevant circular arc. In addition, if the electroconductive member 130 is not required to be square-shaped, the electroconductive member 130 itself may be circular (for example, in FIG. 26, a portion outer than the suction hole 130S is removed), or a forming method in which an unnecessary portion is further removed from the relevant circular shape (in the second opposite electrodes 130b to 130g, the port ion is removed along a circular arc on the side not adjacent to other opposite electrodes) may be employed. However, if the electroconductive member 130 is formed into a shape as shown in FIG. 26 (right), as compared to a shape of an opposite electrode formed by joining processing, a suction path for ambient air into a space in which the negative pressure is generated on the back side of an annular portion of the opposite electrode (a surface on the side not facing a needle-shaped electrode) (in particular, ambient air surrounding the periphery S of the opposite electrode and existing between the opposite electrode and the needle-shaped electrode) can be narrowed, and therefore, the effect of allowing the suction force for the relevant ambient air to be strengthened (the effect of increasing the wind force of the ambient air to be sucked) can be expected. Thus, when an opposite electrode is formed by perforation processing, it is preferable to design the opposite electrode to obtain an optimum shape in light of such an effect.

As shown in FIGS. 27(a) and 27(b), even in a configuration in which, seemingly, a plurality of main electrode pairs are provided, and sub-electrode pairs are arranged surrounding the main electrode pairs (a configuration in which a plurality of annular opposite electrodes shown by thick lines in FIG. 27(b) may be considered as annular opposite electrodes in the main electrode pairs (and annular opposite electrodes arranged on the outer circumferences and shown by thin lines may be considered as annular opposite electrodes in the sub-electrode pairs), an opposite electrode may be configured as an assembly although a single main electrode pair is provided and sub-electrode pairs are arranged surrounding the main electrode pair. Namely, as a supplement, as shown in "an image drawing of annular opposite electrodes in a main electrode pair" in FIG. 28, among annular opposite electrodes shown by thick lines, the annular opposite electrodes located at the center are considered as annular opposite electrodes in a main electrode pair, and the annular opposite electrodes therearound shown by thick lines are considered as annular opposite electrodes in a sub-electrode pair, whereby it is possible to understand that the opposite electrode is an assembly of these electrode pairs. Thus, even if the suction hole 130S is provided along the outer circumferences of the sub-electrode pairs shown in FIG. 27(b), it can be said that this case is in a conceptual range in which the suction hole 130S is provided along an outer circumference although a single main electrode pair is provided and sub-electrode pairs are arranged surrounding the main electrode pair.

The invention claimed is:

1. An ion/ozone wind generation device comprising a plurality of electrode pairs having a needle-shaped electrode and an opposite electrode, ions, ozone, and ion wind being generated using corona discharge by generating a potential difference between the respective electrode pairs,
   wherein the opposite electrode in each of the electrode pairs is formed into a planar and annular or spiral shape,
   a main electrode pair as a pair of electrodes and a plurality of sub-electrode pairs as electrode pairs in which the opposite electrodes are regularly located adjacent or proximate to each other so as to surround the opposite electrode in the main electrode pair along an outer circumference of the opposite electrode in the main electrode pair are provided, the shortest distance between the outer circumferences of the adjacent opposite electrodes at least in the sub-electrode pairs is not more than a diameter of the opposite electrodes thereof, planar normal vectors in all the opposite electrodes are directed in substantially the same directions,
   the opposite electrode in the main electrode pair and the opposite electrodes in the sub-electrode pairs are formed by through holes in a planar electroconductive member, and the planar electroconductive member has a through hole formed along the outer circumference of the opposite electrodes in the sub-electrode pairs.

2. The ion/ozone wind generation device according to claim 1, wherein the opposite electrode has a planar main annular opposite electrode and a planar sub annular opposite electrode surrounding the main annular opposite electrode,
   the longest distance between a tip of a needle-shaped electrode in a certain electrode pair and the main annular opposite electrode in the certain electrode pair is smaller than the shortest distance between the tip of the needle-shaped electrode in the certain electrode pair and the sub annular opposite electrode in the certain electrode pair.

3. The ion/ozone wind generation device according to claim 2, wherein the opposite electrodes in all the electrode pairs have substantially the same shape.

4. The ion/ozone wind generation device according to claim 1, wherein the opposite electrodes in all the electrode pairs have substantially the same shape.

5. An ion/ozone wind generation device comprising a plurality of electrode pairs having a needle-shaped electrode and an opposite electrode, ions, ozone, and ion wind being generated using corona discharge by generating a potential difference between the respective electrode pairs,
   wherein the opposite electrode in each of the electrode pairs is formed into a planar and annular or spiral shape,
   a main electrode pair as a pair of electrodes and a plurality of sub-electrode pairs as electrode pairs in which the opposite electrodes are regularly located adjacent or proximate to each other so as to surround the opposite electrode in the main electrode pair along an outer circumference of the opposite electrode in the main electrode pair are provided, the shortest distance between the outer circumferences of the adjacent opposite electrodes at least in the sub-electrode pairs is not more than a diameter of the opposite electrodes thereof, planar normal vectors in all the opposite electrodes are directed in substantially the same directions, the opposite electrode has a planar main annular opposite electrode and a planar sub annular opposite electrode surrounding the main annular opposite electrode, the longest distance between a tip of a needle-shaped electrode in a certain electrode pair and the main annular opposite electrode in the certain electrode pair is smaller than the shortest distance between the tip of the needle-shaped electrode in the certain electrode pair and the sub annular opposite electrode in the certain electrode pair, the opposite electrode and the needle-shaped electrode in all the electrode pairs are located in different and opposed positions along the axial direction of the needle-shaped electrode.

6. The ion/ozone wind generation device according to claim 5, wherein the opposite electrode in the main electrode pair and the opposite electrodes in the sub-electrode pairs are formed by through holes in a planar electroconductive member, and the planar electroconductive member has a through hole formed along the outer circumference of the opposite electrodes in the sub-electrode pairs.

7. The ion/ozone wind generation device according to claim 5, wherein the opposite electrodes in all the electrode pairs have substantially the same shape.

8. The ion/ozone wind generation device according to claim 6, wherein the opposite electrodes in all the electrode pairs have substantially the same shape.

9. An ion/ozone wind generation device comprising a plurality of electrode pairs having a needle-shaped electrode and an opposite electrode, ions, ozone, and ion wind being generated using corona discharge by generating a potential difference between the respective electrode pairs, wherein the opposite electrode in each of the electrode pairs is formed into a planar and annular or spiral shape, a main electrode pair as a pair of electrodes and a plurality of sub-electrode pairs as electrode pairs in which the opposite electrodes are regularly located adjacent or proximate to each other so as to surround the opposite electrode in the main electrode pair along an outer circumference of the opposite electrode in the main electrode pair are provided, the shortest distance between the outer circumferences of the adjacent opposite electrodes at least in the sub-electrode pairs is not more than a diameter of the opposite electrodes thereof, planar normal vectors in all the opposite electrodes are directed in substantially the same directions, the opposite electrode has a planar main annular opposite electrode and planar sub annular opposite electrode surrounding the main annular opposite electrode, the longest distance between a tip of a needle-shaped electrode in a certain electrode pair and the main annular opposite electrode in the certain electrode pair is smaller than the shortest distance between the tip of the needle-shaped electrode in the certain electrode pair and the sub annular opposite electrode in the certain electrode pair, the opposite electrode and the needle-shaped electrode in all the electrode pairs are located in different and opposed positions along the axial direction of the needle-shaped electrode, the ion wind generated by the main electrode pair is pushed to the front side while being pushed from behind by tailwind of the ion wind generated by the sub-electrode pairs.

* * * * *